(12) United States Patent
Dorofiyenko et al.

(10) Patent No.: US 12,028,266 B2
(45) Date of Patent: Jul. 2, 2024

(54) UTILIZING THROUGHPUT RATE TO DYNAMICALLY GENERATE QUEUE REQUEST NOTIFICATIONS

(71) Applicant: Lyft, Inc., San Francisco, CA (US)

(72) Inventors: Maxim Dorofiyenko, El Cerrito, CA (US); Nir Even Chen, Redwood City, CA (US); Dean Israel Grosbard, Albany, CA (US); Jeremy Alexander Karp, San Francisco, CA (US); Manu Singh Sabherwal, San Francisco, CA (US); Lily Sierra, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 808 days.

(21) Appl. No.: 16/836,331

(22) Filed: Mar. 31, 2020

(65) Prior Publication Data

US 2021/0306280 A1 Sep. 30, 2021

(51) Int. Cl.

| | |
|---|---|
| *H04L 12/863* | (2013.01) |
| *G06F 3/0481* | (2022.01) |
| *G06Q 10/02* | (2012.01) |
| *G06Q 50/40* | (2024.01) |
| *H04L 12/801* | (2013.01) |
| *H04L 43/0888* | (2022.01) |
| *H04L 47/11* | (2022.01) |
| *H04L 47/62* | (2022.01) |
| *H04L 47/625* | (2022.01) |

(52) U.S. Cl.
CPC ........ *H04L 47/6255* (2013.01); *G06F 3/0481* (2013.01); *G06Q 10/02* (2013.01); *G06Q 50/40* (2024.01); *H04L 43/0888* (2013.01); *H04L 47/11* (2013.01); *H04L 47/622* (2013.01)

(58) Field of Classification Search
CPC . H04L 47/6255; H04L 43/0888; H04L 47/11; H04L 47/622; G06F 3/0481; G06Q 10/02; G06Q 50/30
USPC .......................................................... 370/235
See application file for complete search history.

(56) References Cited

U.S. PATENT DOCUMENTS

| | | | |
|---|---|---|---|
| 11,037,263 B2* | 6/2021 | Li .......................... G06F 3/0482 |
| 2014/0129302 A1* | 5/2014 | Amin ..................... G06Q 50/40 705/13 |
| 2018/0121847 A1* | 5/2018 | Zhao ................ G06Q 10/06311 |
| 2018/0322420 A1* | 11/2018 | Marco ................ G06Q 30/0284 |

(Continued)

*Primary Examiner* — Faisal Choudhury
(74) *Attorney, Agent, or Firm* — Keller Preece PLLC

(57) ABSTRACT

The present disclosure relates to systems, non-transitory computer-readable media, and methods for dynamically controlling requestor device queues by monitoring and utilizing the throughput rate of matched provider devices and requestor devices. In some embodiments, the disclosed systems determine throughput rate of matched provider devices and requestor devices in real-time and/or predicts throughput rate utilizing historical features of a particular location. The disclosed systems can generate and provide queue request notifications to requestor devices based on a throughput rate at the location. Specifically, the disclosed systems can monitor a current queue status over time, compare the queue status to a queue threshold, and dynamically generate queue request notifications that reflects throughput-based queue modifiers as the current queue status approaches the queue threshold.

20 Claims, 14 Drawing Sheets

(56) References Cited

U.S. PATENT DOCUMENTS

2019/0057478 A1\* 2/2019 Mu ................... G06Q 50/40
2020/0260217 A1\* 8/2020 Choi .................. H04W 4/023

\* cited by examiner

UTILIZING THROUGHPUT RATE TO DYNAMICALLY GENERATE QUEUE REQUEST NOTIFICATIONS

BACKGROUND

Recent years have seen significant development in transportation matching systems that utilize web and mobile applications to manage real-time on-demand transportation requests from requestor devices. For example, on-demand transportation matching systems can match provider devices with requestor devices to provide transportation across a variety of geographic locations, including high-traffic locations such as airports, sports venues, or city-centers. Although on-demand transportation matching systems can match requestors and providers at these high-traffic areas, such systems suffer from a number of technical problems, particularly in accuracy, efficiency, and flexibility of implementing computer systems.

BRIEF SUMMARY

Embodiments of the present disclosure provide benefits and/or solve one or more of the foregoing or other problems in the art with systems, non-transitory computer-readable media, and methods for dynamically controlling requestor device queues at congested venues by monitoring the throughput rate of matched provider devices and requestor devices in real-time to generate and provide dynamic queue request notifications to requestor devices. To illustrate, the disclosed systems can dynamically generate and provide queue request notifications to requestor devices to adjust the number of requestor devices at a particular location based on the throughput rate for the particular location. More specifically, in one or more embodiments, the disclosed systems determine a wait time threshold for a location and detect a real-time throughput rate corresponding to the location (e.g., based on global positioning data for matched provider devices and requester devices leaving the location). Based on the wait time threshold and the real-time throughput rate, the disclosed systems can determine a queue threshold corresponding to a particular location. In response to receiving transportation requests from additional requester devices at the location, the disclosed systems can utilize the queue threshold and the current queue status to generate queue request notifications to dynamically adjust the number of requester devices. Indeed, the disclosed systems can provide queue request notifications that comprise user interface elements suggesting modified locations, requesting alternate digital requestor queues, modifying a pick-up time, or displaying dynamic transportation value modifiers.

Moreover, in some embodiments, the disclosed systems can utilize a weighted combination of throughput-based metrics and provider-based metrics to generate queue request notifications. For example, the disclosed systems can identify a provider-based queue modifier (such as a provider-based primetime transportation value modifier) and a throughput-based queue modifier (such as throughput-based primetime transportation value modifier). Utilizing the current queue status relative to the queue threshold, the disclosed systems can combine the provider-based queue modifier and the throughput-based queue modifier to generate a combined queue modifier. The disclosed systems can then generate and provide a queue request notification reflecting the combined queue modifier to efficiently, accurately, and flexibly control requestor devices at a congested venue.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
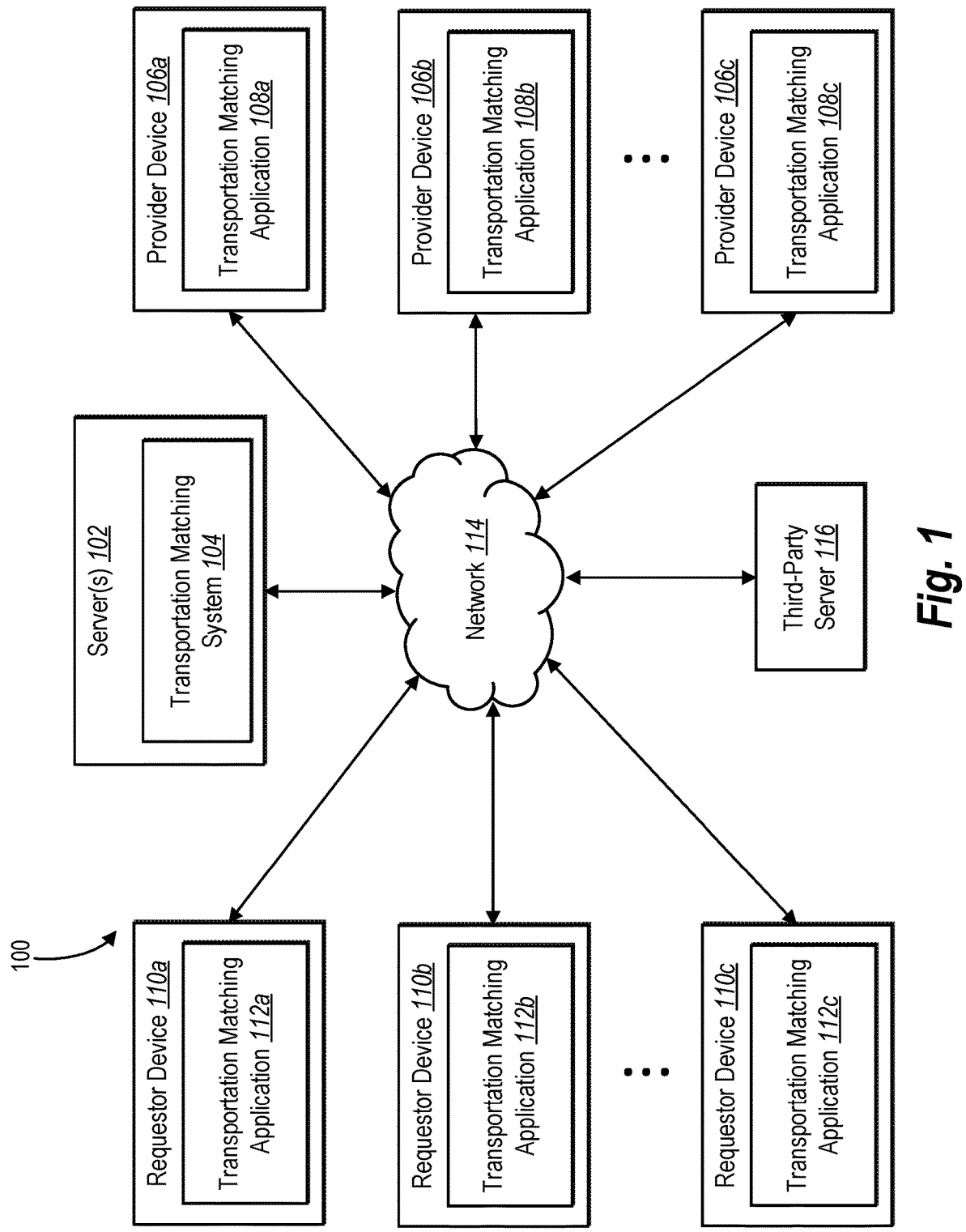
FIG. 1 illustrates a diagram of an environment in which a transportation matching system can operate in accordance with one or more embodiments.

This disclosure describes one or more embodiments of a transportation matching system that monitors and utilizes real-time throughput rate of matched provider devices and requestor devices at congested venues in conjunction with queue status to dynamically generate and provide queue request notifications to requestor devices. More specifically, the transportation matching system can determine a wait time threshold at a location and monitor real-time throughput rate of requestor devices and provider devices at the location. Based on the throughput rate and the wait time threshold, the transportation matching system can determine a queue threshold for the location. The transportation matching system can then monitor the current queue status at the location and utilize the queue threshold to generate and provide queue request notifications to requestor devices that operate to dynamically adjust the number of requester devices in queue at any particular location. More specifically, in some embodiments, the transportation matching system generates and provides queue request notifications based on the current queue status and the queue threshold such that the wait time for requestor devices in the digital requestor queue does not exceed the wait time threshold.

As mentioned above, in one or more embodiments, the transportation matching system determines a throughput rate for a particular time and for a particular location. For example, in one or more embodiments, the transportation matching system determines the current throughput rate in real-time based on fulfilled transportation requests and transportation matches between requestor devices and provider devices at the location. In particular, the transportation matching system can utilize data global positioning system data (GPS data) from requestor devices and/or provider devices to determine when a transportation match associated with the requestor and/or provider devices leaves the location. Further, the transportation matching system determines a throughput rate based on the number of matched provider devices and requester devices leaving the location over time.

In some embodiments, the transportation matching system can also utilize a variety of variables or features of a particular location at a particular time to determine throughput rate. For example, the transportation matching system can utilize traffic information, event information, or weather information to further determine a throughput rate at any particular time or location by comparing the current features to historical feature data (e.g., utilizing a machine learning model). In some embodiments, the transportation matching system determines throughput rate based on a particular transportation mode (e.g., modes specific to a particular type of vehicle, modes particular to a preferred requestor device base, or modes specific to a particular transportation value). The transportation matching system can thus analyze, forecast, and balance throughput rate at each location in a geographic area (e.g., each pickup location at an airport) to improve efficiency of the transportation matching system.

The transportation matching system can also flexibly identify a location or geographical area for identifying throughput rate and providing queue request notifications. Indeed, the transportation matching system can define locations at a variety of different levels of granularity to control a variety of digital requestor queues. For example, with regard to an airport, the transportation matching system can analyze individual exit points (e.g., individual doors at the airport), specific pick-up curbs, different pick-up lots (e.g. an on-site parking lot and a remote parking lot), an airport gate, or an airport as a whole. Similarly, for a sports venue, the transportation matching system can analyze a particular exit, a particular length of road, or the entire venue as a whole. In some embodiments, the transportation matching system defines a geographic area or location for measuring throughput and generating queue request notifications using a particular bounding shape (e.g., a circular geohash defined by a geographical radius).

As mentioned above, in some embodiments, the transportation matching system determines a wait time threshold corresponding to a location (e.g., a wait time threshold reflecting a maximum wait time for a particular location). The transportation matching system can determine the wait time threshold utilizing a variety of processes, including based on user selection, based on user profiles (e.g., requestor devices can have different wait time tolerances), based on features of the congested venue, based on a congestion model, and/or based on a requestor device retention model. For example, in some embodiments, the transportation matching system analyzes historical throughput rate and historical provider device queues at a location to generate a congestion model for the location. The transportation matching system can identify an inflection point within the congestion model reflecting a digital requestor queue length beyond which, the curvature or responsiveness of the congestion model does not show a threshold deviation with respect to the number (or rate) of provider devices in the provider device queue. Based on this inflection point, the transportation matching system can make a variety of determinations regarding a particular location, including the factors controlling throughput for a particular location, a queue threshold, a wait time threshold, and/or a predicted throughput rate.

Moreover, as mentioned, in some embodiments the transportation matching system determines a wait time threshold based on a requestor device retention model. In particular, the transportation matching system can generate a requestor device retention model that reflects the number of requestor devices that migrate from the transportation matching system over a retention period based on a measure of requestor device queue status. Specifically, the transportation matching system can utilize a requestor device retention model that reflects a ratio of requestor device retention loss relative to the length of digital requestor queues. The transportation matching system can identify a threshold retention rate and utilize the threshold retention rate in conjunction with the requestor device retention model to select a queue threshold and/or wait time threshold for a particular location.

As mentioned above, the transportation matching system can utilize throughput rate and a wait time threshold to determine a queue threshold. For example, by applying the throughput rate (e.g., the number of matching provider devices and requestor devices leaving a location over a specific period of time) to the wait time threshold (e.g., the maximum wait time), the transportation matching system can identify a queue threshold reflecting a limit to the number of requestor devices for a digital requestor queue at a particular location. Thus, the queue threshold can reflect a target maximum number of requestors in a digital requestor queue corresponding to the location in order to satisfy the wait time threshold in light of a throughput rate at a particular time.

As mentioned above, the transportation matching system can monitor a queue status of a digital requestor queue to generate and provide queue request notifications to requestor devices. In particular, the transportation matching system can compare a current queue status to a queue threshold to generate and provide queue request notifications. As the current queue status (e.g., the number of requestor devices in the digital requestor queue) approaches the queue threshold, the transportation matching system can transmit queue request notifications to requestor devices to reduce the number of requestor devices (and corresponding congestion) at the location. For example, as the current queue status approaches the queue threshold, the transportation matching system can increase transportation value. As the current queue status recedes from the queue threshold, the transportation matching system can increase the transportation value (e.g., price).

To illustrate, the transportation matching system can receive a transportation request from a requestor device (e.g., to be added to the digital requestor queue). In response to receiving the transportation request, the transportation matching system can determine the current queue status of the digital requestor queue, compare the current queue status to the queue threshold, and provide a queue request notification to the requestor device. The queue request notification can reflect a variety of queue modifiers (e.g., variables to adjust the digital requestor queue) corresponding to the requested ride at the location. For example, the queue request notification can include an option to delay a pick-up time for transportation service, an option to utilize an alternate pick-up location, an option to utilize a different transportation/vehicle type corresponding to a different digital requestor queue, or a notification of a modified transportation value (e.g., price) for the transportation service.

As just mentioned, the queue request notification can include one or more of queue modifiers to adjust a requestor device queue (e.g., modified pick-up time, a dynamic price modifier, etc.). In one or more embodiments, the transportation matching system determines these queue modifiers based on different underlying models and then combines the queue modifiers to generate the queue request notification. For example, in some embodiments, the transportation matching system determines a provider-based queue modifier that reflects a model based on analyzing a number of available provider devices. Moreover, in some embodiments, the transportation matching system determines a throughput-based queue modifier that reflects a model based on analyzing the current throughput rate. The transportation matching system can combine these queue modifiers to dynamically adjust queue request notifications as the number of queue requestor devices approaches the queue threshold.

More specifically, in some embodiments, the transportation matching system utilizes the ratio between the current queue status and the queue threshold as a weighting factor in combining provider-based queue modifiers and throughput-based queue modifiers. Utilizing this weighted combination approach, the transportation matching system can emphasize throughput-based queue modifiers in queue request notifications when the current queue status approaches the queue threshold while emphasizing provider-based queue modifiers when the current queue status retreats from the queue threshold.

As mentioned, the transportation matching system can also provide the queue request notification based on a comparison of different pick-up locations. For example, the transportation matching system can determine a first queue modifier for a first pick-up location (e.g., a first price modifier for a first pick-up location) and a second queue modifier for a second location (e.g., a second price modifier for a second pick-up location). The transportation matching system can provide a queue request notification including information based on both the first and second queue modifiers for each of the pick-up locations (e.g., provide the first price modifier and the second price modifier so that the requestor device can see a price difference between the first location and the second location). Accordingly, in one or more embodiments, the transportation matching system can include one or more incentives within the queue request notification for a requestor device to utilize a less congested pick-up location.

Although the foregoing examples emphasize requestor devices and digital requestor queues, the transportation matching system can also apply the foregoing processes to digital provider queues at congested venues. Indeed, the transportation matching system can provide dispatch notifications (or pre-dispatch notifications) to provider devices based on real-time throughput rates and driver capacity thresholds (e.g., curb capacity). Thus, the transportation matching system can control provider device queues and requestor device queues by dynamically analyzing throughput rate at congested venues.

As briefly mentioned above, a number of technical problems exist with conventional transportation systems, particularly in accuracy, efficiency, and flexibility of implementing computer systems. For example, conventional transportation systems often lack accuracy in determining digital parameters for generating transportation matches and fulfilling transportation services between requestor devices and provider devices. More specifically, many conventional systems compare a number of requestor devices and provider devices at a location to determine digital parameters for transportation services. For example, if the number of requestor devices exceeds the number of provider devices, conventional systems will often transmit increased digital price quotes. However, when limitations outside of relative numbers of provider devices and requestor devices constrain transportation services (such as congestion), many conventional systems transmit inaccurate information (e.g., lower a digital price quote) and exacerbate the limitation conditions. The inaccuracy of conventional systems often leads to high wait times for provider devices and requestor devices, which can cause users to migrate to alternate online systems.

The inaccuracy of conventional systems also leads to inefficient utilization of system resources. To illustrate, many conventional systems devote inordinate resources to corrections as a result of high wait times. For example, conventional systems often devote increased computational resources for remedying the resulting effects of excessive wait times in positioning, matching, and managing provider devices and requestor devices. In particular, conventional systems devote significant computational resources to processing excessively long digital queues, receiving and processing cancellations, providing digital updates to requestor devices or provider devices, generating and transmitting digital maps over extended periods of time to requestor devices and provider devices, notifying matched devices of cancellations, re-joining different devices to requestor queues and/or provider queues, and various other processes for matching provider devices and or requestor devices. The waste of system resources is only exacerbated by the complexity of managing excessive digital cancellations from both provider devices and requestor devices that fluctuate in real-time based on the inaccuracy of conventional systems.

Additionally, conventional systems often lack flexibility in operation. For example, conventional transportation systems often utilize static models that account for a single factor in setting digital parameters for transportation services. Indeed, as mentioned above, conventional transportation systems often consider a balance of requestor devices and provider devices in determining such digital parameters. However, this rigid approach fails to account for the myriad of factors that can impact congested venues for requestor device queues and provider device queues.

In view of the foregoing, the transportation matching system can provide several technical advantages relative to conventional systems. For example, the transportation matching system can improve accuracy by utilizing the throughput rate of matched provider devices and requestor devices to model a variety of factors to generate queue request notifications. For example, by utilizing the throughput rate, the transportation matching system can accurately model traffic conditions, limited space for pick-ups and drop-offs, weather restrictions, lane closures, and other limitations particular to real-time variations at congested venues, and incorporate these limitations into queue request notifications. Additionally, the transportation matching system can utilize real-time GPS data to accurately monitor and account for rapidly changing conditions. Thus, the transportation matching system can determine queue modifiers (such as pick-up time modifiers, digital queue changes, or pricing parameter modifications) and generate queue request notifications that accurately account for controlling features at a particular location.

The transportation matching system can also improve efficiency relative to conventional systems. For example, the transportation matching system can improve efficiency by reducing system resources utilized to correct (or otherwise compensate for) inaccuracies, excessive wait times, and cancellations resulting from conventional systems. That is, by utilizing queue request notifications to dynamically control device queues, the transportation matching system conserves resources by reducing digital communications, time, and processing resources needed by conventional systems. For example, the transportation matching system utilizes fewer resources than conventional systems in providing updates to waiting requestor and provider devices, receiving and processing cancellations, modifying dispatching and forecasting models, notifying devices of cancellations, and managing excessive communications and queries from a greater volume of devices in an unduly large queue. Moreover, these efficiency improvements can also reduce wait times and migration of devices to alternate online systems.

The transportation matching system can further provide technical advantages in flexibility of operation. In contrast to conventional systems, the transportation matching system can account for a wide array of controlling factors that impact digital parameters corresponding to generating transportation matches and facilitating transportation services. For example, as mentioned above, the transportation matching system can implement throughput-based models that reflect a variety of physical limitations, such as congestion, weather, traffic limitations (e.g., lane closures), or limited curb space. Moreover, the transportation matching system can combine throughput-based models with provider-based models based on real-time monitoring of queue status and throughput rate to flexibly adjust to changes in controlling factors over time. Moreover, because the transportation matching system can monitor throughput rate and queue status in real time (and/or forecast throughput rate and queue status), the transportation matching system can flexibly respond to sudden condition changes (e.g., surges and lulls in requests, weather changes, traffic changes, accidents etc.).

As illustrated by the foregoing discussion, the present disclosure utilizes a variety of terms to describe features and advantages of the transportation matching system. Additional detail is now provided regarding the meaning of such terms. For example, as used herein, the term "throughput rate" refers to a rate of matched provider devices and requestor devices. In particular, the term "throughput rate" can include a rate of fulfilled transportation requests between provider devices and requestor devices at a particular location. To illustrate, a throughput rate can include a rate at which matched provider devices and requestor devices complete a pick-up and leave the pick-up location.

As used herein, the term "transportation request" refers to an indication that a requestor/passenger seeks transportation services. A transportation request can include a digital indicator that a requestor device seeks transportation services from a pick-up location to a destination location at a particular time. A transportation request can include a variety of indications from a requestor device. For example, a transportation request can include an indication that a requestor device has initiated a session via a transportation matching application (e.g., executing and/or logging into a transportation matching application). Similarly, a transportation request can include an indication of interactions with one or more fields of a transportation matching application (e.g., entering a pick-up location or a destination location via a user interface of a transportation matching application). Moreover, a transportation request can include an indication that a user has selected to formally submit a query for a provider vehicle to provide transportation services.

Additionally, as used herein, the term "provider device" refers to a computing device associated with a transportation provider and/or transportation vehicle. Similarly, the term "requestor device" refers to a computing device associated with a transportation requestor. Relatedly, as used herein, the term "matched provider device and requestor device" refers to a provider device and a requestor device associated with one another as part of a transportation request. For example, a matched provider device and requestor device can include a requestor device that submitted a transportation request and the provider device that the transportation matching system selected to service that request.

Further, as used herein, the term "queue threshold" refers to a threshold measure of devices corresponding to a queue. In particular, a queue threshold can include a predefined number of requestor devices submitting transportation requests from a geographic location (e.g., GPS coordinate, geohash, facility, venue, airport, street, curb, zone, stage, meter, etc.). For example, the queue threshold may include an airport requestor queue capacity (e.g., twenty requestors in a line), a maximum number of requestor devices in a digital requestor queue to maintain a wait time, a maximum number of requestor devices in a digital requestor queue before the transportation matching system will provide queue request notifications, etc. The transportation matching system may utilize different queue thresholds for different pick-up locations at a location, different ride types, etc. The transportation matching system can determine a queue threshold based on a throughput rate and a wait time threshold. The transportation matching system can also determine a queue threshold based physical features or limitations (e.g., size of a physical line area provided at a pick-up location). The transportation matching system can also determine a queue threshold utilizing a variety of other approaches (e.g., based on a congestion model or retention model described below).

Also, as used herein, the term "wait time threshold" refers to a threshold measure of time that a requestor and/or requestor device await transportation services. For example, a "wait time threshold" can include a maximum (e.g., longest permissible) time between a requestor device submitting a transportation request and beginning a transportation service (e.g., entering a provider vehicle).

Additionally, as used herein, the term "digital requestor queue" (or "requestor device queue) refers to waiting requestor devices for a particular location or geographic area. In particular, the term "digital requestor queue" can include a number of requestor devices that have submitted a transportation request corresponding to a location (but have not yet started a transportation service or ride). In some cases, a digital requestor queue can denote an order or sequence of requestor devices (e.g., based on an order of submitting a transportation request). Additionally, the transportation matching system can determine when matched provider devices and requestor devices initiate a transportation request, depart the pick-up location, and accordingly exit the digital requestor queue.

Relatedly, as used herein, the term "current queue status" refers to a current measure of requestor devices in a digital requestor queue. In particular, the term "current queue status" can include a number of requestor devices currently in a digital requestor queue. To illustrate, a current queue status can include a current number of requestor devices that have submitted a transportation request and have not yet completed a pick-up. In some embodiments, current queue status can refer to a different measure of a requestor queue (such as a current wait time associated with the current digital requestor queue).

Further, as used herein, the term "queue request notification" refers to a digital notification corresponding to a digital requestor queue. In particular, the queue request notification can include a digital notification provided to a requestor device in response to a transportation request (e.g., a request to join or continue in a digital requestor queue). In one or more embodiments, the queue request notification includes options and/or information corresponding to a queue and its associated wait times. For example, a queue request notification can include queue modifiers that include information to adjust a digital requestor queue, such as pricing information about a requested queue and alternate queues, alternate transportation types and alternate pick-up locations at a location. Additionally, a queue request notification can include options to switch to an alternate digital requestor queue or to delay a request.

As mentioned, in one or more embodiments, the queue request notification includes one or more queue modifiers. As used herein a "queue modifier" (or "modifier") refers to an adjustable parameter corresponding to a digital requestor queue. In particular, a queue modifier can include an adjustable parameter that impacts the length of a digital requestor queue. For example, a queue modifier can include a price modifier (e.g., a primetime cost increase to reduce the number of requestor devices) or a pick-up time modifier (e.g., a delay in pick-up time to reduce the number of requestor devices in a current queue).

As discussed above, the transportation matching system can utilize a provider-based queue modifier and a throughput-based queue modifier. For example, as used herein, the term "provider-based queue modifier" refers to a queue modifier determined based on provider device availability (e.g., a queue modifier identified using a provider-based model). To illustrate, a provider-based queue modifier can include a price modifier based on provider device availability. Additionally, as used herein, the term "throughput-based queue modifier" refers to a queue modifier based on a throughput rate (e.g., a queue modifier identified using a throughput-based model). To illustrate, a throughput-based queue modifier can include a price modifier based on throughput rate. Relatedly, as used herein, the term "combined queue modifier" refers to a modifier determined utilizing multiple queue modifiers (e.g., both a provider-based queue modifier and a throughput-based queue modifier). In some embodiments, the transportation matching system selects between multiple queue modifiers. As used herein, the term "final queue modifier" refers to a queue modifier selected for use in a queue request notification.

Further, as used herein, the term "congestion model" refers to a model for analyzing congestion at a location. In particular, a congestion model can compare throughput rate relative to a measure of requestor devices at a location. Accordingly, the transportation matching system can utilize the congestion model to determine whether throughput rate at a location is limited by shortfall of provider devices, congestion, or other factors. Further, the transportation matching system can utilize the congestion model to determine various thresholds related to a location, such as a queue threshold and/or wait time threshold.

Additionally, as used herein, the term "inflection point" refers to a point on a graph or model corresponding to a change in curvature. In particular, the term "inflection point" can include a point on a congestion model at which increased supply of provider devices does not show a threshold deviation in the a number (or rate) of fulfilled transportation requests. Thus, the transportation matching system can utilize the inflection point of a congestion model to determine various thresholds related to a location, such as the queue threshold and/or the wait time threshold.

Additional detail will now be provided in relation to illustrative figures portraying example embodiments and implementations of the transportation matching system. For example, FIG. 1 illustrates a computing system environment (or "environment") 100 for implementing a transportation matching system in accordance with one or more embodiments. As shown in FIG. 1, the environment 100 includes server(s) 102, a transportation matching system 104, provider devices 106a-106n, requestor devices 110a-110n, a network 114, and a third-party server 116. Each of the components of the environment 100 can communicate via the network 114, and the network 114 may be any suitable network over which computing devices can communicate. Example networks are discussed in more detail below in relation to FIG. 11.

As shown in FIG. 1, the environment 100 includes the provider devices 106a-106n (collectively, the provider devices 106). Similarly, the environment 100 includes the requestor devices 110a-110n (collectively, the requestor devices 110). The provider devices 106 and the requestor devices 110 can each be one of a variety of computing devices, including a smartphone, tablet, smart watch, smart television, desktop computer, laptop computer, virtual reality device, augmented reality device, or other computing device as described in relation to FIG. 11. Additionally or alternatively, in some embodiments, one or more of the provider devices 106 are attached to (or integrated within) transportation vehicles (e.g., autonomous transportation vehicles). Furthermore, FIG. 1 illustrates multiple provider devices 106 and multiple requestor devices 110. However, in some embodiments the environment 100 can include a single provider device 106 and/or a single requestor device 110.

In addition, the provider devices 106 and the requestor devices 110 can further communicate with the server(s) 102, including the transportation matching system 104, via the network 114. For example, in response to transportation requests from the requestor devices 110, the transportation matching system 104 can communicate with the provider devices 106 and/or the requestor devices 110 via the network 114 to provide various communications (e.g., pre-dispatch notifications, matching notifications, pickup locations, queue request notifications, etc.).

As shown, each of the provider devices 106 and the requestor devices 110 include corresponding transportation matching applications 108a-108n and 112a-112n, respectively. In particular, the transportation matching applications 108a-108n and 112a-112n (collectively, applications 108 and applications 112, respectively) may be a web application, a native application installed on the provider devices 106 and the requestor devices 110 (e.g., a mobile application, a desktop application, etc.), or a cloud-based application where part of the functionality is performed by the server(s) 102. The applications 108 and the applications 112 can present or display information to users respectively associated with the provider devices 106 and the requestor devices 110, including queue request notifications and other information relating to transportation requests, transportation matching, pickup, etc. as described in more detail below. As an example, the transportation matching application 108a can cause the provider device 106a to communicate with the transportation matching system 104 for receiving instructions regarding pre-dispatch to a geographical area, navigation to a pickup location to pick up a requestor, etc.

As illustrated in FIG. 1, the environment 100 includes the server(s) 102. The server(s) 102 may execute, generate, store, receive, and transmit electronic data, such as executable instructions for utilizing throughput rate corresponding to a location to dynamically control digital requestor queues at the location. For example, the server(s) 102 may receive transportation requests from the requestor devices 110 at the location. In turn, the server(s) 102 can transmit data associated with the transportation requests to one or more components in the environment 100. In one or more embodiments, the server(s) 102 can provide queue request notifications to the requestor devices 110 in response to receiving the transportation request(s) and based on a throughput rate at the location. Additionally, the server(s) 102 may send location data and/or ETA data for one or more of the provider devices 106 to the requestor devices 110.

In some embodiments, the server(s) 102 and the third-party server 116 can exchange digital data. Utilizing the exchanged digital data (e.g., weather data, flight data, event information from a third-party server) the transportation matching system 104 can predict a throughput rate corresponding to a location at a future time. In some implementations for instance, the server(s) 102 may obtain flight information from the third-party server 116 to help predict or forecast transportation requests at an airport. Additionally or alternatively, in some embodiments, the third-party server 116 (whether the same or a different third-party server) may include event data, weather data, traffic data, construction data, and other data that may affect a throughput rate at the location. Additionally or alternatively, the third-party server 116 can comprise an application server, a communication server, a web-hosting server, a social networking server, or a digital content management server.

Although FIG. 1 depicts the transportation matching system 104 located on the server(s) 102, in some embodiments, the transportation matching system 104 may be implemented by one or more other components of the environment 100 (e.g., by being implemented entirely or in part at one or more of the other components). For example, the transportation matching system 104 may be implemented in whole, or in part, by the provider devices 106, the requestor devices 110, and/or the third-party server 116.

Although not illustrated in FIG. 1, in some embodiments, the environment 100 may have a different arrangement of components and/or may have a different number or set of components altogether. For example, in certain implementations, some or all of the provider devices 106 are computing devices unassociated with a human transportation provider and constitute autonomous transportation vehicles—that is, a self-driving vehicle that includes computer components and accompanying sensors for driving without manual-provider input from a human operator. As a further example, in some embodiments, one or more of the provider devices 106 include a hybrid self-driving vehicle with both self-driving functionality and some human operator interaction.

When a provider device is an autonomous vehicle or a hybrid self-driving vehicle, the provider device may further include additional components not depicted in FIG. 1. Such components may include location components, one or more sensors by which the autonomous vehicle navigates, and/or other components necessary to navigate without a provider (or with minimal interactions with a provider). Additionally, or alternatively, the provider devices 106 may be subcomponents of a vehicle computing system. Regardless of its form, the provider devices 106 may include various sensors, such as a GPS locator, an inertial measurement unit, an accelerometer, a gyroscope, a magnetometer, and/or other sensors, from which the transportation matching system 104 can access information, such as location data.

Figure 2:
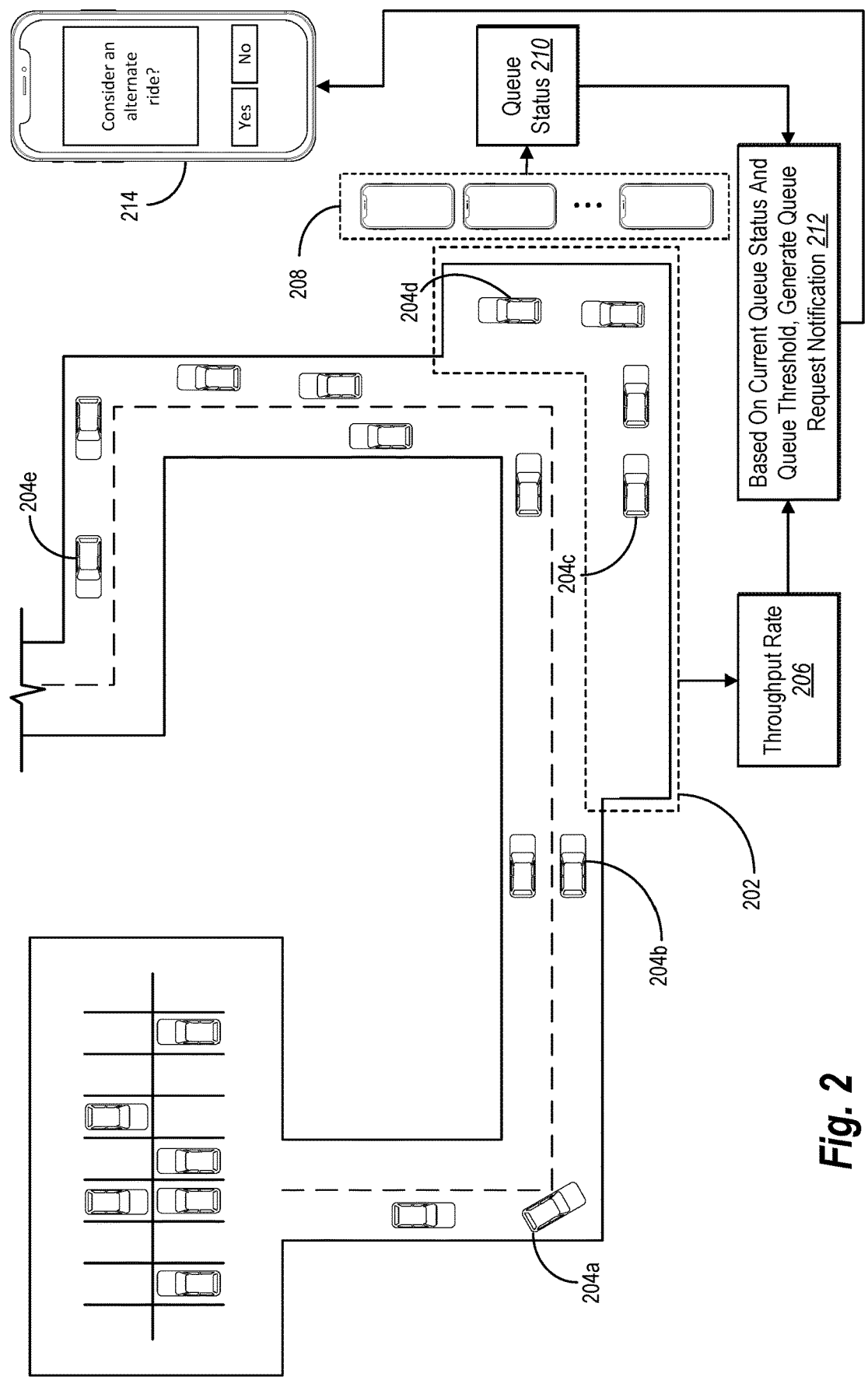
FIG. 2 illustrates an overview diagram of generating and providing a queue request notification in accordance with one or more embodiments.

As mentioned above, the transportation matching system 104 can dynamically utilize throughput rate in conjunction with queue status to dynamically generate and provide queue request notifications. FIG. 2 illustrates an overview of a process for providing a queue request notification in response to receiving a transportation request. FIG. 2 illustrates a pick-up location 202 associated with a digital requestor queue.

Additionally, FIG. 2 illustrates the provider vehicles 204a-204e, each of which are associated with a provider device. As discussed above, in one or more embodiments utilizing autonomous vehicles, the provider vehicles 204a-204e may include provider devices. As shown in FIG. 2 the provider vehicles 204a-204e move through the pick-up location 202. More specifically, the provider vehicles 204a-204e pick-up a matched requestor associated with a requestor device and leave the pick-up location 202 to service the transportation request. In one or more embodiments, the transportation matching system 104 utilizes GPS data and other data from provider devices and requestor devices to determine when a pick-up has taken place and when the provider vehicles 204a-204e have departed the pick-up location 202.

As shown in FIG. 2, the transportation matching system 104 can determine a throughput rate 206 associated with the pick-up location 202. The throughput rate 206 can reflect a number of provider vehicles 204a-204e moving through the pick-up location 202, performing pick-ups, and/or initiating the fulfillment of a transportation request over a given period of time. As mentioned above, the transportation matching system 104 can utilize GPS data and other data (e.g. provider device selections, requestor device selections, requestor profile information, historical information, etc.) from provider devices and requestor devices to determine activity in the pick-up location 202.

The transportation matching system 104 can utilize this GPS and other data to dynamically determine a current throughput rate for a location in real time. To illustrate, the transportation matching system 104 can determine when matched requestor and provider devices leave the pick-up location 202 and initiate fulfillment of a transportation request. In one or more embodiments, the transportation matching system 104 can interpret these successful pickups as having moved through the pick-up location 202 and can accordingly utilize them to determine a throughput rate corresponding to the pick-up location 202. Additionally, as will be discussed in greater detail below with regard to FIG. 3, the transportation matching system 104 can predict throughput rates based on a variety of criteria such as weather forecasts, event data, and construction data.

As also shown in FIG. 2, available space for pick-ups is limited in the pick-up location 202. Accordingly, the provider vehicles 204a-204e may not be able to move freely through the pick-up location 202 due to congestion. Thus, in some circumstances, the throughput rate may be constrained by the congestion of the pick-up area. Therefore, the transportation matching system 104 utilizing GPS data and other data to determine the throughput rate in real-time can facilitate dynamic control of a digital requestor queue.

As also shown in FIG. 2, the pick-up location 202 is associated with a digital requestor queue 208. The digital requestor queue 208 includes requestor devices with an open or active transportation request associated with the pick-up location 202. The digital requestor queue 208 can include both requestor devices that have been matched with a provider device and/or requestor devices that have not been matched with a provider device.

As shown in FIG. 2, the transportation matching system 104 can dynamically determine the queue status 210 of the digital requestor queue 208. The transportation matching system 104 can dynamically track requestor devices entering the digital requestor queue 208 by monitoring transportation requests submitted or modified by the requestor devices. Further, the transportation matching system 104 can dynamically track requestor devices leaving the digital requestor queue 208 by tracking requestors being picked up and leaving the pick-up location 202 and/or cancelling or modifying a transportation request.

Further, the transportation matching system 104 can utilize the throughput rate 206 and the queue status 210 to perform an act 212 of, based on current queue status and queue threshold, generating a queue request notification 214. As will be discussed in greater detail below with regard to FIG. 3, the transportation matching system 104 can utilize a wait time threshold and a throughput rate to determine a queue threshold. In some embodiments, the transportation matching system 104 utilizes the current queue status relative to the queue threshold and/or requestor data to determine a queue request notification. Additionally, as will be discussed in greater detail below with regard to FIG. 4, the transportation matching system 104 can utilize various queue modifiers to generate the queue request notification 214.

As shown in FIG. 2, the transportation matching system 104 can provide the queue request notification 214 to a requestor device. The queue request notification 214 can include price(s) modified based on the queue threshold and the current queue status 210 (e.g., increase the price as the current queue status 210 approaches the queue threshold). Additionally, the queue request notification 214 can include various options to modify a request and/or to join an alternate digital requestor queue.

Although FIG. 2 illustrates a particular pick-up location, the transportation matching system 104 can operate with regard to a variety of locations and geographic areas at various levels of granularity. For example, the transportation matching system 104 can define and coordinate multiple pick-up locations within a single location, such as different terminals at a single airport. However, the transportation matching system 104 can also define multiple locations within a single building and/or establishment. For example, the transportation matching system 104 can define different entrances to a shopping mall as different locations. In another example, the transportation matching system 104 can define a city block as a location including multiple pick-up locations or can define corners of a single city block as separate locations.

In one or more embodiments, the transportation matching system 104 can define a location based on a particular radius. The transportation matching system 104 can define and identify the radius of a location utilizing a corresponding geohash. In one or more embodiments, the transportation matching system 104 defines location radii based on volume of requests experienced within a radius. For example, the transportation matching system 104 can determine that a location should have a maximum volume of requests over time and can define location radii such that no location exceeds the maximum volume.

Additionally, in one or more embodiments, the transportation matching system 104 can define radii for locations based on mobility between pick-up locations within a location. For example, a location may have multiple pick-up areas that are geographically nearby but are not nearby in terms of connections for foot traffic. The transportation matching system 104 can analyze historical data regarding requestor device utilization of pick-up locations to determine accessibility (e.g., accessibility routes to a pick-up location for requestors). To illustrate, the transportation matching system 104 can identify a lack of access between locations by identifying geographical areas where requestor devices, despite geographical proximity to a pick up location, repeatedly utilize an alternate pick-up location. Based on this determination, the transportation matching system 104 can define areas that are not connected or easily accessible as separate locations.

For example, many requestors may request to be picked up at the front gate of an amusement park despite other locations outside of the park being geographically closer. The transportation matching system 104 can identify a lack of mobility/accessibility for foot traffic between the interior of the amusement park and other pick-up locations nearby (and can accordingly define them as separate locations). Accordingly, the transportation matching system 104 can define locations and pick-up locations based on accessibility between geographical areas.

Additionally, the transportation matching system 104 can define and utilize timed locations that are only congested for limited periods of time and/or limited days or seasons. In one or more embodiments, the transportation matching system 104 identifies a timed location based on determining an increase in requests over a short period of time and/or in contrast with historical records of transportation requests from similar locations and time in transportation requests in a geographical radius during a limited period of time. Then, the transportation matching system 104 defines a geohash corresponding to that geographical radius as a timed location during the time period corresponding to the increase in transportation requests over the short period of time. In one or more embodiments, the timed location can replace an existing location structure for the time period. For example, in some embodiments, the transportation matching system 104 defines a corner of a city block as a location during rush hour but defines the entire city block as a location outside of rush hour. In another example, the transportation matching system 104 can define a shopping mall as a single location on weekdays and having multiple locations on weekends.

Additionally, the transportation matching system 104 can determine timed locations based on received event data. For example, the transportation matching system 104 can determine that a large event will take place over a period of time (e.g. a week-long convention, a sporting event over an evening, or a weekend getaway/festival). The transportation matching system 104 can utilize a received geographical location associated with this event to define a timed location for the duration of the event and/or for a pick-up and drop-off corresponding to the event. For example, the transportation matching system 104 can define a location for a football stadium during pick-up and drop-off for a game. In another example, the transportation matching system 104 can define a convention center as a single location by default but can define the convention center as multiple locations over the four-day duration of a large convention.

Figure 3:
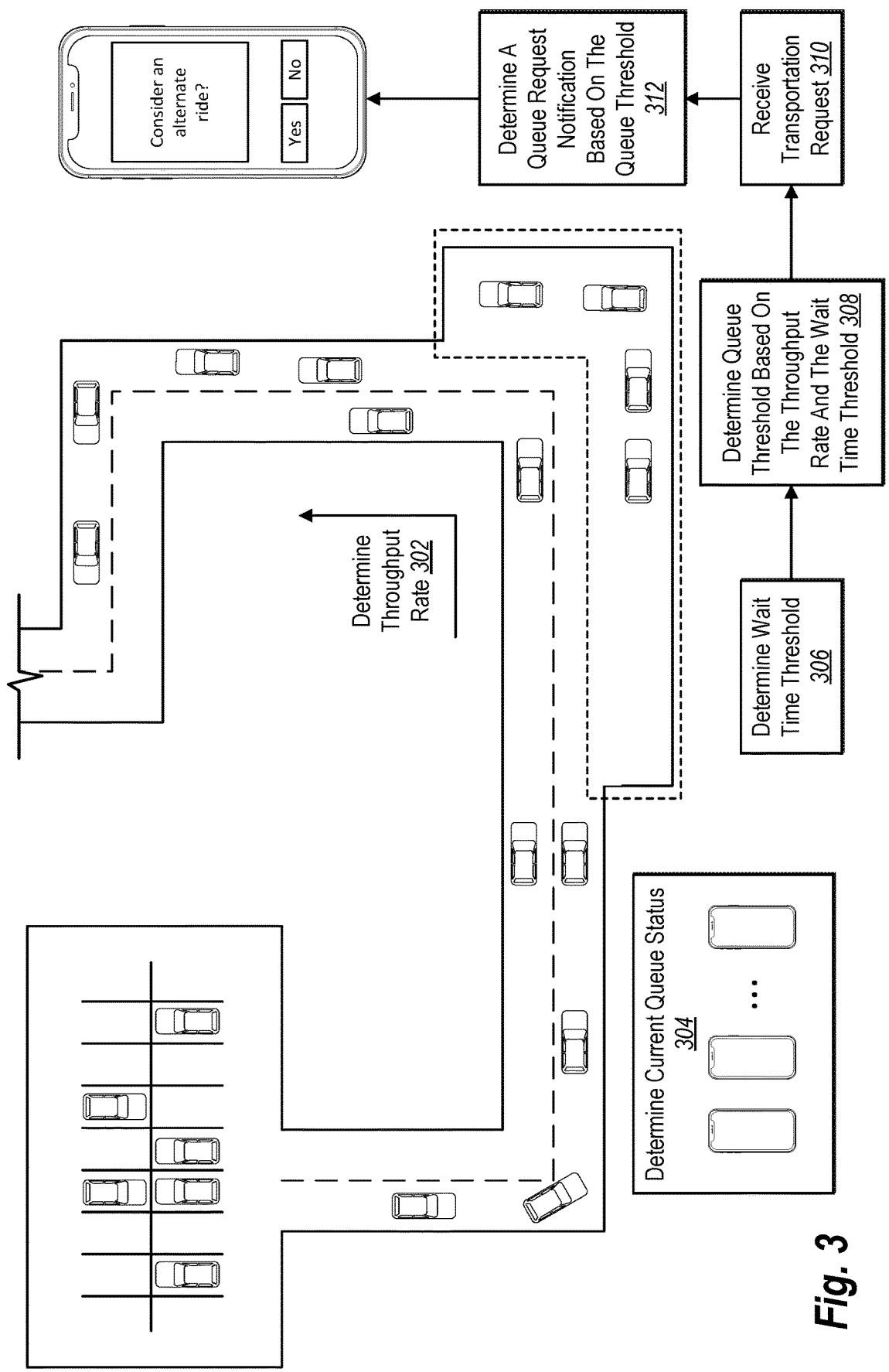
FIG. 3 illustrates a diagram of determining a queue request notification in response to a transportation request in accordance with one or more embodiments.

Turning to FIG. 3, the transportation matching system 104 can determine a queue request notification in response to receiving a transportation request. As shown in FIG. 3, the transportation matching system 104 can perform the act 302 of determining the throughput rate. As discussed above, the transportation matching system 104 can determine the current throughput rate in real-time based on GPS data and other data received from requestor devices and provider devices. In some embodiments, the transportation matching system 104 utilizes matched provider devices and requestor devices successfully initiating fulfillment of a transportation request and departing a pick-up location over a particular period of time as the throughput rate. For example, if 100 provider devices move into the pick-up location, locate and pick up a matched requestor device, and depart the pick-up location with the requestor device in one hour, then the transportation matching system 104 can determine that the throughput rate is 100 requests per hour.

Further, in one or more embodiments, the transportation matching system 104 predicts a throughput rate corresponding to a location and/or to a pick-up location at the location. For example, the transportation matching system 104 can utilize historical throughput rates to predict future throughput rates. In one or more embodiments, the transportation matching system 104 utilizes historical throughput rates associated with a location to predict future throughput rates for the same location.

For example, the transportation matching system 104 can determine historical throughput rates for a location based on received data from requestor and/or provider devices. In some embodiments, the transportation matching system 104 identifies similar dates and/or times to the future time from a throughput database including historical throughput and associated circumstances from previous dates. To predict a throughput rate for a future time at the location, the transportation matching system 104 can identify previous times at the location similar to the future time. The transportation matching system 104 can utilize calendar information and any received information about the future time (e.g. weather, traffic, and/or event information). For example, the transportation matching system 104 can identify previous Thursday nights as similar to a future Thursday night, prior Mother's day Sundays as similar to a future Mother's day Sunday, and/or could identify a previous date with a similar event and weather to an event and weather of a future date.

In some embodiments, to determine a predicted throughput rate, the transportation matching system 104 can average the throughput rates for the location of the determined similar dates and/or times. For example, using this method, a future time with similar times with throughput rates of 5 pick-ups per minute, 10 pick-ups per minute, and 9 pick-ups per minute has a throughput rate of (5+10+9)/3=8 pick-ups per minute.

Additionally, the transportation matching system 104 can determine similarity weights for dates and/or times based on a degree of similarity between the future time and the past time. Further, the transportation matching system 104 can determine the predicted throughput rate as the average of the throughput rates of the determined similar dates and/or times as modified by a corresponding similarity weight. For example, using this method, a future time with similar times with throughput rates of 5 pick-ups per minute and a similarity weight of 1, 10 pick-ups per minute a similarity weight of 2, and 9 pick-ups per minute a similarity weight of 2 has a predicted throughput rate of (5(1)+10(2)+9(2))/5=8.6 pick-ups per minute.

Moreover, in some embodiments, the transportation matching system 104 can predict a future throughput rate utilizing a machine learning model. The transportation matching system can utilize a variety of machine learning models. For example, the machine learning model can include a neural network, including a convolutional neural network, a recurrent neural network, an autoencoder, a multilayer perceptron, and/or various other types of neural networks. In some embodiments, the machine learning model can include a decision tree, regression model, or support vector machines.

In one or more embodiments, the transportation matching system 104 trains the machine learning model based on historical data about various previous dates and their corresponding throughput rates. For example, the transportation matching system 104 can utilize a calendar date, holiday information, event information (e.g., flight take-off or landing information; sports event start, intermission, or end information; or other information relating to timing, size, or type of an event), weather information, and other received information received as training input for the machine learning model. The machine learning model can analyze the training input and generate a predicted throughput rate. The machine learning model can compare the predicted throughput rate with a ground truth measure (e.g., an observed throughput rate). For example, the transportation matching system 104 can utilize a loss function to back-propagate and modify internal parameters of the machine learning model to improve accuracy. In this manner, the transportation matching system 104 can train a machine learning model to analyze information regarding a location and generate a predicted throughput rate for a future time period.

Additionally, the transportation matching system 104 can utilize historical data corresponding to a variety locations to predict throughput rates for similar locations. In some embodiments, the transportation matching system 104 identifies similar locations based on location type (e.g. airport, event venue, shopping mall), location region (e.g. the Midwest, northeast Las Vegas, a coastal area), and/or a location size (e.g. 2 acres, 60,000 square feet, 4,500 person capacity). Further, the transportation matching system 104 can identify similar times based on season, day of the week, holidays, dates, and/or events. Then, the transportation matching system 104 can identify a throughput rate associated with the similar times. As discussed above, the transportation matching system 104 can utilize the throughput rates associated with the similar times to determine a predicted throughput rate based on an average, a similarity weight, a machine learning model, and/or other methods.

For example, the transportation matching system 104 can predict a throughput rate at a theatre in Chicago on a Saturday, March 28 between 6:00 μm and 8:00 μm. The transportation matching system 104 identifies historical throughput rates for the theatre on Saturdays in March between 6:00 μm and 8:00 pm. Additionally, the transportation matching system 104 identifies one theatre in Chicago and one theatre in New York with similar seating capacities and identifies throughput rates for theses theatres on Saturdays in March between 6:00 μm and 8:00 μm. The transportation matching system 104 utilizes the historical throughput rates for the theatre and for the similar theatres to predict a throughput rate for the theatre Saturday, March 28 between 6:00 pm and 8:00 μm.

In some embodiments, the transportation matching system 104 determines a similarity weights for the similar theatres and/or similar previous times. Further, the transportation matching system 104 can determine a weighted average throughput rate based on the prior throughput rates and utilize that weighted average throughput rate as the predicted throughput rate. In one or more other embodiments, the transportation matching system 104 utilizes a trained machine learning model to determine the predicted throughput rate utilizing the Saturday, March 28 between 6:00 pm and 8:00 pm for the theatre as input.

Additionally, the transportation matching system 104 can utilize data from third-party servers to predict the throughput rate 206. In some embodiments, the transportation matching system 104 can utilize weather forecasts to predict throughput rate. Additionally, the transportation matching system 104 can utilize construction information, traffic prediction information, and other information corresponding to a predicted location. For example, the transportation matching system 104 can determine that the throughput rate at the theatre decreases 20% when there is rain. Thus, based on identifying a weather forecast indicating rain, the transportation matching system 104 decreases a throughput rate prediction by 20%.

Further, the transportation matching system 104 can utilize event data to generate throughput rate predictions. In some embodiments, the transportation matching system 104 can receive and utilize information including start and end times and predicted crowds for concerts, sporting events, conventions, and other events. Additionally, the transportation matching system 104 can utilize flight times to predict throughput rate at an airport. The transportation matching system 104 can utilize past event data corresponding to similar events, including previous iterations of an event, to predict a throughput rate. For example, the transportation matching system 104 can determine that the theatre will host a travelling production on Saturday March 28 beginning at 6:30 pm and ending at 7:30 μm. The transportation matching system 104 can identify theatres previously hosting the travelling production experienced a 40% increase in throughput rate over similar dates when hosting the production. Thus, the transportation matching system 104 can adjust its prediction for the theatre on Saturday March 28 by 40%.

Additionally, in some embodiments, the transportation matching system 104 determines and/or predicts a throughput rate corresponding to a single mode of transportation. For example, the transportation matching system 104 can determine and/or predict a throughput rate corresponding to a standard transportation requestor queue and a throughput rate corresponding to a luxury transportation requestor queue. More specifically, the transportation matching system 104 can determine the throughput rate for the standard requestor queue and the luxury requestor queue at the same location and/or at the same pick-up location. Moreover, the transportation matching system 104 can determine separate wait time thresholds and queue thresholds for digital requestor queues corresponding to these different modes of transportation at the same location. Accordingly, the transportation matching system 104 can dynamically control various digital requestor queues corresponding to different modes of transportation at the same location.

Further, the transportation matching system 104 can perform an act 304 of determining current queue status. To illustrate, the transportation matching system 104 can dynamically monitor the current queue status of a pick-up location at a location. The transportation matching system 104 can receive transportation requests from requestor devices and can assign the requestor devices to a digital requestor queue based on the received transportation request. Accordingly, the transportation matching system 104 can determine when requestor devices enter a digital requestor queue.

The transportation matching system 104 can also track when requestor devices exit a digital requestor queue. For example, the transportation matching system 104 can track and implement cancellation requests and modification requests associated with transportation requests. Additionally, as discussed above, the transportation matching system 104 can determine when a requestor device leaves the digital requestor queue by leaving the pick-up location with a matched provider device. Thus, the transportation matching system 104 can determine the current queue status of a digital requestor queue at a variety of times.

Additionally, as shown in FIG. 3, the transportation matching system 104 can perform an act 306 of determining a wait time threshold. The transportation matching system 104 can determine the wait time threshold in a variety of ways. In some embodiments, the transportation matching system 104 determines the wait time threshold based on user selection (e.g., user input via an administrator device indicating the maximum wait time for a particular location). In other embodiments, the transportation matching system 104 determines the wait time threshold based on historical data. For example, the transportation matching system 104 can detect an increase over a short period of time and/or in contrast with historical records for cancellations or negative sentiment (e.g., negative ratings) at requestor devices beyond a particular wait time. The transportation matching system 104 can select the wait time threshold based on the particular wait time.

In some embodiments, the transportation matching system 104 determines wait time based on user profiles or historical information corresponding to requestor devices in a particular requestor device queue. For example, different requestors can have different tolerances for wait times at particular locations. The transportation matching system 104 can analyze historical data corresponding to particular requestors (e.g., the requestor profile) to determine a particular wait time tolerance.

To illustrate, the transportation matching system 104 can determine that a particular requestor has waited for 30 minutes at an airport on five previous occasions, and given positive reviews after fulfillment of transportation services after those occasions. The transportation matching system 104 can determine that the individual wait time threshold for that requestor device is greater than 30 minutes. Indeed, in some embodiments, the transportation matching system 104 performs a weighted combination of previous wait times (based on requestor device feedback or ratings) to determine an individual wait time threshold for individual requestors. For example, if a requestor waited for 15 minutes and gave a "5 Star" review on a first occasion, and waited for 45 minutes and gave a "1 Star" review on a second occasion, the transportation matching system can utilize a weighted combination of the two wait times to select a wait time threshold, such as $((5 \times 15)+(1 \times 45))/(6)$.

Although one or more embodiments use a weighted average or combination, in some embodiments, the transportation matching system 104 can utilize a machine learning model to predict individual or combined wait time thresholds. For example, the transportation matching system 104 can utilize a machine learning model (such as a recurrent neural network or convolutional network) to analyze user profiles (e.g., historical wait times, locations, and ratings), and generate a predicted wait time threshold (e.g., an individual wait time threshold or a combined wait time threshold for the requestor devices in the requestor device queue). The transportation matching system 104 can train such a machine learning model utilizing training user profiles and historical ground truth labels (e.g., historical cancellations or historical wait times). For example, the transportation matching system 104 can analyze a user profile utilizing a machine learning model, generate a predicted wait time threshold, and then compare the predicted wait time threshold to an observed cancellation wait time corresponding to the user.

In some embodiments, the transportation matching system 104 can analyze a wait time threshold for each requestor in a requestor device queue to select a final wait time threshold. For example, the transportation matching system can combine individual wait time thresholds (e.g., average wait time thresholds for each requestor). In some embodiments, the transportation matching system utilizes the smallest wait time threshold from the requestor devices (or the largest wait time threshold). In some embodiments, the transportation matching system selects a different wait time threshold (e.g., a wait time threshold that is shorter than 80% of the wait time thresholds for the requestor devices in the requestor device queue).

As will be discussed in greater detail below with regard to FIG. 8, in some embodiments the transportation matching system 104 utilizes a congestion model and/or requestor device retention model to determine the wait time threshold. More specifically, the transportation matching system 104 can utilize an inflection point within a congestion model to identify a variety of features of a particular location, including the controlling restrictions limiting throughput, a predicted throughput rate, a queue threshold, and/or a wait time threshold. In addition, the transportation matching system 104 can utilize a requestor device retention model in conjunction with a retention threshold to determine a queue threshold and/or wait time threshold.

Further, as shown in FIG. 3, the transportation matching system 104 can perform an act 308 of determining a queue threshold based on the throughput rate and the wait time threshold. In one or more embodiments, the transportation matching system 104 determines a maximum number of requestor devices in a digital requestor queue where a wait time associated with the digital requestor queue satisfies the wait time threshold. Then, the transportation matching system 104 can utilize that maximum number of requestor devices as the queue threshold. In one or more embodiments, the transportation matching system 104 can determine the queue threshold, taking WT as the wait-time threshold and Th(t) as the throughput rate at time t, as WT Th(t). In this manner, the transportation matching system 104 can determine a throughput-based queue threshold.

In addition, in one or more embodiments, the transportation matching system 104 can determine a provider-based queue threshold based on a relative availability of providers. For example, the transportation matching system 104 can determine a provider-based queue threshold based on the wait time threshold and the number of providers available within a particular time. For example, if the transportation matching system 104 determines that 100 providers are available in the next hour and identifies a maximum wait time of thirty minutes, the transportation matching system 104 can identify a queue threshold of 50 providers (e.g., by multiplying the provider availability rate by the maximum wait time). Further, the transportation matching system 104 can determine a final queue threshold as the lower of the throughput-based queue threshold and the provider-based queue threshold. For example, the transportation matching system 104 can take the lower of the throughput-based queue threshold multiplied by a wait time threshold compared to the provider-based queue threshold. Further, the transportation matching system 104 can dynamically update the queue threshold in real-time. As discussed above, in some embodiments, the transportation matching system 104 dynamically determines the throughput rate at a location in real time. The transportation matching system 104 can identify a change in the throughput rate. In response to identifying that change, the transportation matching system 104 can determine an updated queue threshold based on an updated throughput rate.

The transportation matching system 104 can also perform an act 310 of receiving a transportation request. The transportation matching system 104 can receive a transportation request based on a requestor device detecting, and the transportation matching system 104 accordingly receiving, user input interacting with a transportation matching system application. For example, in one or more embodiments, the transportation matching system 104 receives a transportation request based on receiving an indication of a user selection of pick-up location, pick-up time, preferred vehicle type, rider identifier, and/or destination location on a requestor device.

As used herein, "receiving" a transportation request can include receiving a variety of digital information from a requestor device. For example, receiving a transportation request can include receiving an indication that a requestor device has opened or executed a transportation matching application (e.g., the transportation matching application 112a). Similarly, receiving a transportation request can include receiving an indication that a requestor device has entered transportation data (e.g., pick-up location, drop-off location, vehicle type, pick-up time, etc.). into a transportation matching application. In addition, receiving a transportation request can include receiving an indication that requestor device has formally submitted a transportation request (e.g., select a submit element for submitting the transportation information to remote server). The transportation matching system 104 can provide a queue request notification in response to receiving a transportation request in any of these approaches. Similarly, the transportation matching system 104 can provide a queue request notification to requestor devices waiting in a digital request queue.

As shown in FIG. 3, the transportation matching system 104 can further perform an act 312 of determining a queue request notification based on the queue threshold. As will be discussed below with regard to FIGS. 6A-6D, the transportation matching system 104 can generate a variety of queue request notifications. A queue request notification can include a variety of options and information about a transportation request, potential options for the transportation request, and/or information about potential modifications to the transportation request.

As illustrated, in one or more embodiments, the transportation matching system 104 determines a queue request notification based on the queue threshold. For example, the transportation matching system 104 can generate a queue request notification including information about the transportation request based on comparing the queue threshold and the current queue status (e.g., based on a ratio between the queue threshold and the current queue status). As discussed above, the transportation matching system 104 can utilize queue request notifications to dynamically control requestor queues. Accordingly, the transportation matching system 104 can include information and options in the queue request notification encouraging requestor devices to join requestor queues that do not currently satisfy a corresponding queue threshold and not to join requestor queues that do currently satisfy a corresponding queue threshold. Further, the transportation matching system 104 can encourage requestor devices to join requestor queues based on a degree to which a current queue status approaches and/or exceeds a corresponding queue threshold.

In some embodiments, a queue request notification can include transportation values for different transportation options associated with different digital requestor queues. To illustrate, the transportation matching system 104 can determine prices corresponding to different transportation options and can generate a queue request notification including those prices. As will be discussed in greater detail with regard to FIG. 4, the transportation matching system 104 can determine various prices to include in a queue request notification based on various queue modifiers. Accordingly, in one or more embodiments, the transportation matching system 104 provides user interface elements including prices in queue request notifications.

Additionally, in one or more embodiments, the transportation matching system 104 generates a queue request notification providing a user interface element including an option to select an alternate location for a transportation request. For example, the transportation matching system 104 can provide a queue request notification including an option to utilize an alternate pick-up location within a geographic area (e.g., a different pick-up lot outside of an airport terminal). Additionally or in the alternative, the transportation matching system 104 can provide a queue request notification including an option for a pick-up at a different location (e.g. a nearby location within walking distance).

Further, the transportation matching system 104 can provide a queue request notification that comprises a user interface element including a request to join an alternate digital requestor queue. For example, the transportation matching system 104 can provide an option to join a requestor queue corresponding to an alternate mode of transportation. In one or more embodiments, the transportation matching system 104 determines alternate digital requestor queues for presentation in a queue request notification based on a requested digital requestor queue being near, at, or above its corresponding queue threshold. Then, the transportation matching system 104 can identify alternate digital requestor queues that, relative to the requested digital requestor queue and its queue threshold, satisfy a corresponding queue threshold to a greater degree.

For example, the transportation matching system 104 can generate a queue request notification including an option to join an alternate digital requestor queue corresponding to a different mode of transportation (e.g., a different vehicle type, such as luxury vehicle). Additionally, the transportation matching system 104 can generate a queue request notification including an option to join an alternate digital requestor queue corresponding to a different pick-up time. Further, it will be appreciated that the transportation matching system 104 can generate a queue request notification including an option to join an alternate digital requestor queue corresponding to a variety of transportation options.

Though FIG. 3 illustrates a particular method of determining a queue request notification in accordance with one or more embodiments, it will be appreciated that the transportation matching system 104 can determine queue request notification further based on a variety of factors. For example, the transportation matching system 104 can determine a queue request notification based at least in part on an availability of provider devices. Additionally, the transportation matching system 104 can generate queue request notifications including a variety of kinds of information and options, as will be discussed in greater detail below with regard to FIGS. 6A-6D.

Although FIG. 3 describes utilizing a machine learning model to predict throughput rates for future times, in some embodiments, the transportation matching system 104 also utilizes a machine learning model to predict changes in throughput rate with different physical characteristics. For example, the transportation matching system 104 can utilize a location type, a location capacity, a geographical region for the location, traffic information corresponding to the location, a number of driving lanes, lane width, construction status, and other location attributes as input for a machine learning model to predict throughput rate.

Additionally, the transportation matching system 104 can utilize this machine learning model to determine potential throughput rates in response to potential modifications to a location. For example, the transportation matching system 104 can determine a current throughput rate for a location by inputting current attributes of the location into the machine learning model. Further, the transportation matching system 104 can determine a potential throughput rate for the location based on a potential increase in capacity by inputting in the potential attributes of the location. In another example, the transportation matching system 104 can determine a potential throughput rate at a location based on changes to the flow of traffic at the location, such as widening a pick-up area or adding another lane of traffic.

Additionally, as mentioned above, the transportation matching system 104 can utilize the throughput rate in conjunction with a dispatch system and/or a pre-dispatch system. The transportation matching system 104 can utilize a dispatch and/or pre-dispatch system to determine whether and when to dispatch a provider device based on whether there will be available space to complete a pick-up. In some embodiments, the transportation matching system 104 modifies the flex forecasting pre-dispatch system described in U.S. application Ser. No. 16/827,305, the entire contents of which are incorporated by reference. That is, the transportation matching system 104 can determine whether and when to dispatch a provider device further based on a throughput rate corresponding to the location.

For example, the transportation matching system 104 can utilize throughput rate to determine available space at a pick-up location (e.g., to predict curb space at an ETA of a provider device pre-dispatched to a curb). Accordingly, the transportation matching system 104 can dispatch or pre-dispatch provider devices more slowly based on the throughput rate of a location. For example, in response to determining that the location is experiencing throughput rate limitations (that limit the number of requestor devices and provider devices that can be matched within a particular time period), the transportation matching system 104 can slow the dispatch and/or pre-dispatch of provider devices. Similar to providing queue request notifications discussed previously, in some embodiments, the transportation matching system 104 can compare different metrics (e.g., provider-based metrics and throughput-based metrics) to pre-dispatch provider devices. For example, the transportation matching system 104 can determine a projected provider curb capacity based on available provider devices and requestor devices. The transportation matching system can also determine a projected provider curb capacity based on throughput (e.g., throughput between the time of dispatch and a projected ETA). The transportation matching system 104 can then select (or combine) the projected curb capacities (e.g., select the minimum curb capacity in applying a look-ahead or look-behind model or applying an average of the projected curb capacities).

Figure 4:
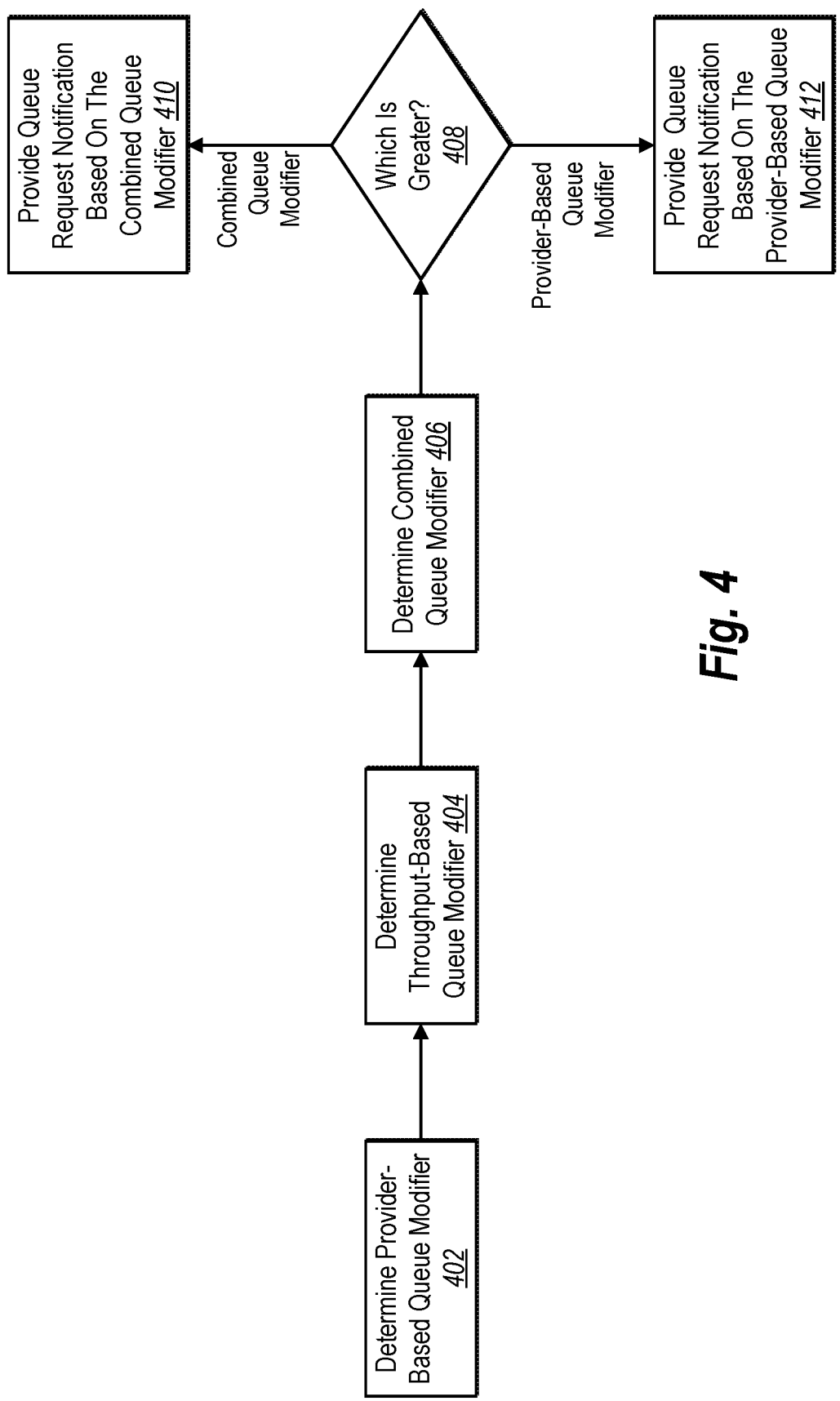
FIG. 4 illustrates a diagram of generating and utilizing queue modifiers to determine a queue request notification in accordance with one or more embodiments.

As discussed above, the transportation matching system 104 can utilize queue modifiers to generate a queue request notification. FIG. 4 illustrates a flowchart for determining and identifying a queue modifier for use in generating a queue request notification. For any of the queue modifiers discussed with regard to FIG. 4, the transportation matching system 104 can dynamically update queue modifiers based on received or identified data, such as data from requestor and/or provider devices, and/or data received from third parties. Accordingly, the transportation matching system 104 can include options and information in queue request notifications based on up-to-date conditions and data.

Additionally, in one or more embodiments, the queue modifiers discussed with regard to FIG. 4 are transportation value modifiers. Indeed, in one or more embodiments the transportation matching system 104 utilizes queue modifiers to dynamically adjust a baseline transportation price. In one or more embodiments, the baseline transportation price may be a default price corresponding to a transportation request. However, the transportation matching system 104 can utilize the queue modifiers to determine a variety of components of a queue request notification (e.g., delayed pick-up times or other parameters).

As shown in FIG. 4, the transportation matching system 104 can perform an act 402 of determining a provider-based queue modifier. In relation to FIG. 4, the transportation matching system 104 determines the provider-based queue modifier for a location based on an availability of provider devices at the location. In one or more embodiments, the transportation matching system 104 determines a provider-based queue modifier as a function of probability of conversion of requestor devices (e.g., a probability that a requestor device will perform a targeted action, such as submit a transportation request, participate in transportation services, etc.). The transportation matching system 104 can select a provider-based queue modifier based on an objective (e.g., an objective function) to balance the requestor devices in a digital requestor queue and the provider devices available to provide for that digital requestor queue.

For example, the system can adjust the number of requestor devices (or provider devices) by altering a dynamic queue modifier (e.g., a dynamic price modifier) corresponding to transportation services. The transportation matching system 104 can utilize historical data corresponding to queue modifiers and associated behavior of provider devices and requestor devices to generate a probability model. In particular, the probability model can reflect a probability of a particular number of requestor devices and/or provider devices at varying queue modifiers. The transportation matching system 104 can select a provider-based queue modifier that, in combination, balances the number of requestor devices and provider devices at a particular location.

For example, in one or more embodiments, the transportation matching system 104 utilizes the probability model to determine a probability of conversion of requestor devices at a particular value for a queue modifier. For example, the transportation matching system 104 can generate the probability model by fitting a curve to historical requestor devices conversions based on different queue modifiers. The transportation matching system 104 can utilize the probability model to determine a probability at various provider-based queue modifiers that requestor devices at a location will submit a transportation request for the requestor device queue. Then, the transportation matching system 104 can utilize this probability in conjunction with the number of requestor devices at a location to determine a converted number of requestor devices. For example, a queue modifier with an associated probability of conversion of 0.3 at a location with 100 requestor devices will yield 30 transportation requests.

The transportation matching system 104 can determine the provider-based queue modifier as a function of this probability of conversion. In particular, the transportation matching system can utilize an objective function that seeks to balance a predicted number of transportation requests with a number of available provider devices at the location. Accordingly, the transportation matching system 104 can select a provider-based queue modifier that is anticipated to make the number of provider devices equals to the number of requestor devices. In particular, the transportation matching system can select a provider-based queue modifier such that the probability of conversion applied to the anticipated demand is equivalent to the number of provider devices.

Additionally, in one or more embodiments, the transportation matching system 104 performs an act 404 of determining a throughput-based queue modifier. In relation to FIG. 4, the transportation matching system 104 determines the throughput-based queue modifier for a location based on a current throughput rate at the location. Similar to the provider-based queue modifier above, in one or more embodiments, the transportation matching system 104 determines throughput-based queue modifier as a function of probability of conversion of requestor devices. The transportation matching system 104 can select a throughput-based queue modifier based on an objective (e.g., an objective function) that seeks to balance the requestor devices in a digital requestor queue and the throughput rate of the location.

For example, the system can adjust the number of requestor devices that will request to join a digital requestor queue utilizing the throughput-based queue modifier. As mentioned above, the transportation matching system 104 can determine a probability model utilizing historical data corresponding to queue modifiers and associated behavior of provider devices and/or requestor devices. The transportation matching system 104 can select a throughput-based queue modifier that causes a number of requestor devices to submit a transportation request such that the throughput rate will accommodate each requestor device in the digital requestor queue. Accordingly, the transportation matching system 104 can utilize historical data to select a throughput-based queue modifier (e.g. transportation value) that balances the anticipated requestor devices and an associated throughput rate.

As mentioned above, in one or more embodiments, the transportation matching system 104 utilizes a probability model that reflects a probability of conversion of requestor devices. Similar to the discussion above, the transportation matching system 104 can determine a probability at various requestor-based queue modifiers that requestor devices at a location will submit a transportation request to join the requestor device queue. Then, as discussed above, the transportation matching system 104 can utilize the conversion probability in conjunction with the number of requestor devices at a location to determine a converted number of requestor devices.

The transportation matching system 104 can determine the throughput-based queue modifier as a function of this probability of conversion by utilizing an objective function that seeks to balance the throughput rate and the number of requestor devices. Accordingly, the transportation matching system 104 can determine a provider-based queue modifier where the throughput rate for a digital requestor queue equals the number of requestor devices in the digital requestor queue. For example, the transportation matching system 104 can select a transportation value such that the probability of conversion applied to the expected demand will match the throughput rate.

Additionally, in one or more embodiments, the transportation matching system 104 determines prices to include in queue request notifications as a function of both the provider-based queue modifier and the throughput-based queue modifier. The transportation matching system 104 can utilize both queue modifiers in a variety of ways. For example, the transportation matching system 104 can utilize a comparison of a provider-based modifier and a throughput-based modifier. Additionally, the transportation matching system 104 can utilize a function uniquely weighting the throughput-based modifier and the provider-based modifier. Further, the transportation matching system 104 can perform an act 406 of determining a combined queue modifier.

In one or more embodiments, the combined queue modifier utilizes both the provider-based queue modifier and the throughput-based queue modifier to determine the combined queue modifier. In some embodiments, the transportation matching system 104 determines the combined queue modifier by weighting the throughput-based queue modifier more heavily, and the provider-based queue modifier less heavily, as a current queue status approaches a queue threshold. Additionally, in one or more embodiments, the transportation matching system 104 utilizes a variety of weighted combinations, such as a linear combination, a quadratic combination, or another combination.

In some embodiments, the combined queue modifier is a dynamic value that can change over time due to changes in conditions at the transportation matching system 104. Further, the transportation matching system 104 can modify the way that it determines the combined queue modifier based on various different conditions. For example, as the ratio between a provider-based modifier and a throughput-based modifier changes, the transportation matching system 104 can weight one queue modifier or the other more heavily. Additionally, the transportation matching system 104 can utilize different combinations in light of different ratios.

Accordingly, the transportation matching system 104 can determine a combined queue modifier utilizing weighted combinations that dynamically adjust in response to changing conditions at a location. In some embodiments, the transportation matching system 104 weights the queue modifiers in a quadratic combination. More specifically, in some embodiments, the transportation matching system 104 weights the provider-based queue modifier less as the number of requestor devices in a digital requestor queue approaches the queue threshold and weights the throughput-based queue modifier more as the number of requestor devices in the digital requestor queue approaches the queue threshold.

The transportation matching system 104 can also perform an act 408 of determining which is greater among the combined queue modifier and the provider based queue modifier. In some embodiments, the transportation matching system 104 can select the greatest from among a throughput-based queue modifier, a provider-based queue modifier, and a combined queue modifier. Indeed, the system can utilize a provider-based queue modifier until the combined queue modifier exceeds the provider-based queue modifier. In this manner, the system can utilize a stable value for the queue modifier until changes in the current queue status warrant an adjustment. Additionally, in one or more embodiments, the transportation matching system 104 selects from a set of queue modifiers including other queue modifiers.

As shown in FIG. 4, if the combined queue modifier is selected (e.g., is greater), the transportation matching system 104 can perform an act 410 of providing a queue request notification based on the combined queue modifier. In one or more embodiments, the transportation matching system 104 takes the combined queue modifier as a final queue modifier based on the determination that the combined queue modifier is greater. More specifically, the transportation matching system 104 can provide a queue request notification to a requestor device based on the combined queue modifier exceeding the provider-based queue modifier.

As also shown in FIG. 4, if the provider-based queue modifier is greater, the transportation matching system 104 performs an act 412 of providing a request notification based on the provider-based queue modifier. In one or more embodiments, the transportation matching system 104 takes the provider-based queue modifier as a final queue modifier based on this determination. To illustrate, the transportation matching system 104 can generate a queue request notification and provide the queue request notification to the requestor device based on the provider-based queue exceeding the combined queue modifier.

In one or more embodiments, the transportation matching system 104 utilizes the final queue modifier as a modification for a baseline transportation value. That is, the transportation matching system 104 modifies the baseline transportation price utilizing the final queue modifier. Further, the transportation matching system 104 can include the price obtained utilizing the baseline transportation price and the final queue modifier in the queue request notification.

As discussed briefly above, the transportation matching system 104 can dynamically control multiple pick-up locations at any particular location or geographical area. For example, as shown in FIG. 5A, a location 500 includes a pick-up location 502 and a pick-up location 504 (e.g., two pick-up locations at a sports venue). The pick-up location 502 and the pick-up location 504 are each at the location 500 but have separate digital requestor queues. More specifically, the pick-up location 502 is associated with a digital requestor queue 506 and the pick-up location 504 is associated with a digital requestor queue 508.

In one or more embodiments, the transportation matching system 104 can manage multiple pick-up locations corresponding to a location including an on-site location and a remote location. For example, at an airport, the transportation matching system 104 can dynamically control digital requestor queues corresponding to a remote lot pick-up location and an on-site lot pick-up location. In one or more embodiments, the remote location may require the requestor to utilize an intermediate transportation, such as a shuttle or tram. The transportation matching system 104 can compare digital requestor queues corresponding to the remote pick-up location and the on-site pick up location further based on a relative desirability or ease of use of the pick-up locations.

Accordingly, in one or more embodiments, the transportation matching system 104 can utilize requestor device data corresponding to a requestor device account and/or historical requestor information to determine which pick-up location to suggest or prompt a requestor device to join. For example, based on determining that a requestor device is associated with a premium membership, the transportation matching system 104 can suggest the on-site pick-up location (e.g. in addition to a premium digital requestor queue). In another example, based on requestor device historical data of preferring short wait times over nearby pick-up locations, the transportation matching system 104 can suggest a remote pick-up location having a shorter associated wait time than an on-site pick up location.

Additionally, there are additional requestor devices 510 at the location 500. The additional requestor devices 510 are not yet in the digital requestor queue 506 or the digital requestor queue 508. The transportation matching system 104 can communicate with some or all of the additional requestor devices 510. For example, the transportation matching system 104 can receive transportation requests from some or all of the additional requestor devices 510. The transportation matching system 104 can generate queue response notifications based on the digital requestor queue 506 associated with the pick-up location 502 and the digital requestor queue 508 associated with the pick-up location 504.

Figure 5B:
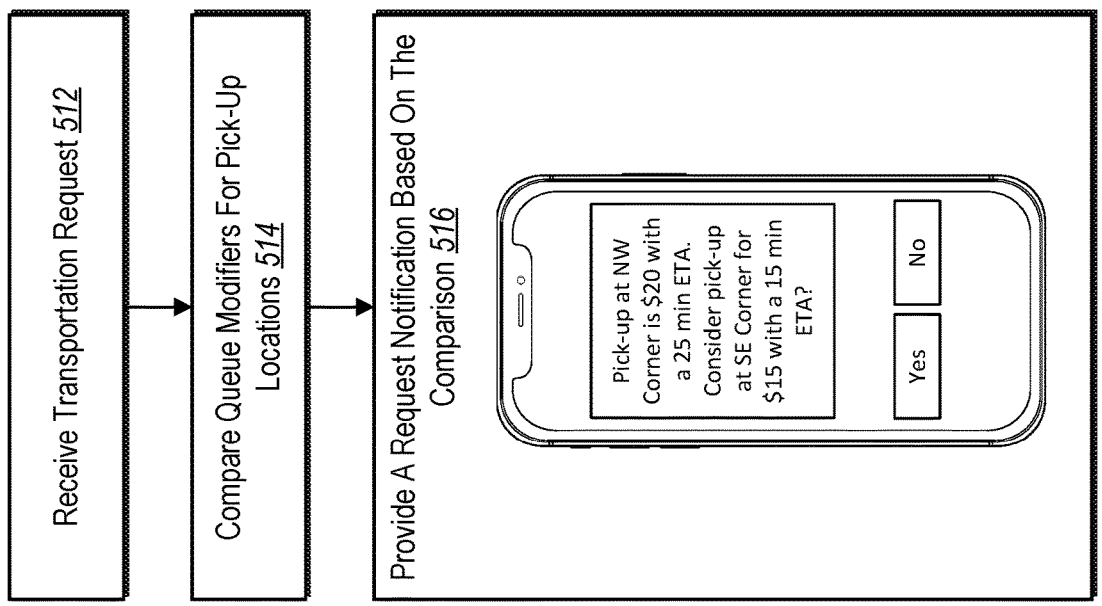
FIGS. 5A-5B illustrate a diagram of controlling multiple queues at a single location utilizing throughput rate in accordance with one or more embodiments.
Figure 5A:
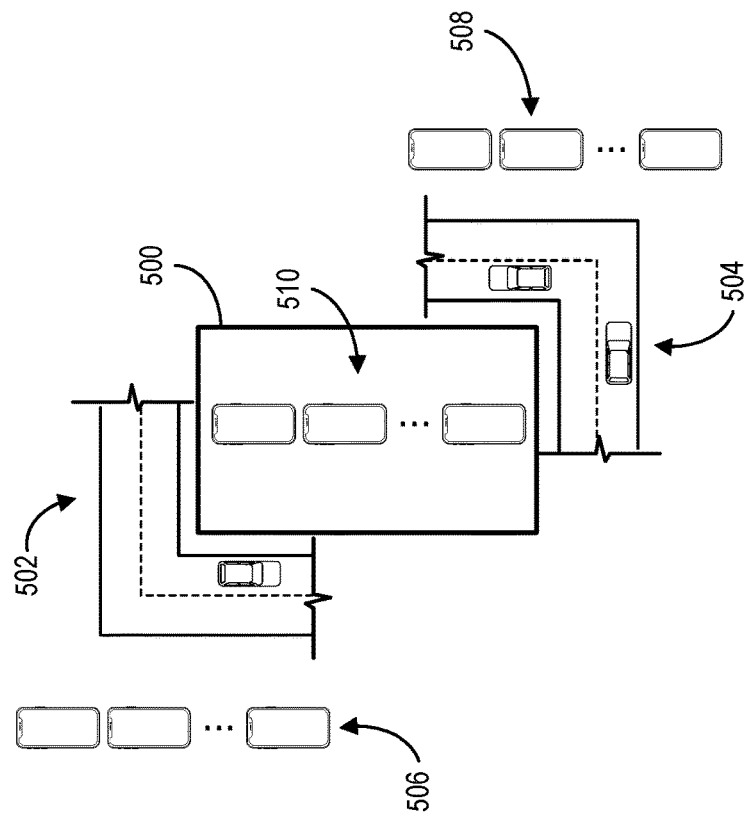

FIG. 5B provides additional detail regarding generating queue response notifications for the pick-up locations 502, 504 in accordance with one or more embodiments. For example, as shown in FIG. 5B, the transportation matching system 104 can perform an act 512 of receiving a transportation request. For example, the transportation matching system 104 can receive a transportation request from a requestor device of the requestor devices 510. The transportation matching system 104 can determine that the received transportation request includes a request to be added to one of the digital requestor queue 506 associated with the pick-up location 502 or the digital requestor queue 508 associated with the pick-up location 504. As mentioned above, receiving a transportation request can include receiving a variety of digital information, including indicators that a requestor device has opened a transportation matching application, has entered transportation data, or has formally submitted information regarding a transportation service to a remote server.

As shown in FIG. 5B, the transportation matching system 104 can also perform an act 514 of comparing queue modifiers for pick-up locations. For example, the transportation matching system 104 can determine queue modifiers for the pick-up location 502 and queue modifiers for the pick-up location 504. More specifically, as discussed above with regard to FIG. 4, the transportation matching system 104 can determine a provider-based queue modifier for each of the pick-up location 502 and the pick-up location 504, a throughput-based queue modifier for each of the pick-up location 502 and the pick-up location 504, and a combined queue modifier for each of the pick-up location 502 and the pick-up location 504. Further, the transportation matching system 104 can identify a final queue modifier as the greater of the provider-based queue modifier and the combined queue modifier for each of pick-up location 502 and the pick-up location 504. Although FIG. 5A illustrates two pick-up locations (e.g., the pick-up location 502 and the pick-up location 504), the transportation matching system 104 can identify and utilize any number of pick-up locations (e.g., identify pick-up locations based on density of transportation requests within a defined radius).

Further, as shown in FIG. 5A, the transportation matching system 104 can perform an act 516 of providing a queue request notification based on the comparison. More specifically, the transportation matching system 104 can provide a queue request notification based on comparison between a final queue modifier corresponding to the pick-up location 502 and a final queue modifier corresponding to the pick-up location 504. Accordingly, the transportation matching system 104 can dynamically control a balance between the digital requestor queue 506 and the digital requestor queue 508. Thus, the transportation matching system 104 can maintain wait times below a wait time threshold corresponding to each of the pick-up location 502 and the pick-up location 504.

In one or more embodiments, the transportation matching system 104 can utilize the queue modifiers for the pick-up locations 502, 504 to determine prices to include in a queue request notification. The transportation matching system 104 can generate a price for joining the digital requestor queue 506 based on a final queue modifier corresponding to the pick-up location 502. Additionally, the transportation matching system 104 can generate a price for joining the digital requestor queue 508 based on a final queue modifier corresponding to the pick-up location. Further, in one or more embodiments, the transportation matching system 104 includes the prices generated based on the final queue modifiers in a queue request notification.

Thus, the transportation matching system 104 can provide a price corresponding to a pick-up location with a higher wait time and/or a longer digital requestor queue that is higher than a price corresponding to a pick-up location with a lower wait time and/or a shorter digital requestor queue. Accordingly, the transportation matching system 104 can utilize the relative pricing to balance requestor devices 510 making transportation requests between the digital requestor queue 506 and the digital requestor queue 508. By providing relative prices in queue request notifications the transportation matching system 104 can direct more of the requestor devices 510 to a shorter digital requestor queue associated with a lower price and fewer of the requestor devices 510 to a longer digital requestor queue associated with a higher price.

Further, as shown in FIG. 5B, the transportation matching system 104 can determine and provide estimated times of arrival (ETAs) corresponding to each of the pick-up locations 502, 504. In one or more embodiments, the transportation matching system 104 provides the ETAs in the queue request notification. Further, in some embodiments, the transportation matching system 104 can determine the ETAs based on the throughput rates at the pick-up locations. For example, the queue request notification illustrated in FIG. 5B reads "Pick-up at NW corner is $20 with a 25 min ETA. Consider pick-up at SE corner for $15 with a 15 min ETA?" By including ETAs in the queue request notification, the transportation matching system 104 can utilize information about wait times and ETAs to dynamically control the digital requestor queues 506, 508. Moreover, in some embodiments, the transportation matching system 104 can include an ETA with an indicator of the portion of the ETA corresponding to wait time/throughput rate (e.g., there is a 25 min ETA to your destination, 10 min of which is awaiting a driver).

As also shown in FIG. 5, and as will be discussed below with regard to FIG. 6, the transportation matching system 104 can provide a queue request notification prompting the user to join a digital requestor queue that is shorter and/or has a lower wait time. For example, the transportation matching system 104 can (1) receive a user request to join the digital requestor queue 506 and (2) determine, based on comparing queue modifiers, to direct the requestor to the digital requestor queue 508. More specifically, in this example, the transportation matching system 104 determines that a queue threshold relative to a current queue status of the digital requestor queue 506 reflects a disproportionately high wait time compared to a queue threshold relative to a current queue status of the digital requestor queue 508. Thus, the transportation matching system 104 provides a queue request notification suggesting modification of the received transportation request to join the digital requestor queue 508.

Additionally, in one or more embodiments, the transportation matching system 104 can include an alternate digital requestor queue corresponding to one or more of the pick-up locations (e.g., a "premium" digital requestor queue). In one or more embodiments, the transportation matching system 104 can associate the alternate digital requestor queue with a lower wait time threshold than other digital requestor queues. Accordingly, the transportation matching system 104 can determine queue modifiers for the premium digital requestor queue reflecting that lower wait time threshold. Thus, in one or more embodiments, the transportation matching system 104 can provide an option with lower wait times for premium pricing based on associated queue modifiers.

As discussed above, the transportation matching system 104 can provide queue request notifications in response to receiving transportation requests. FIGS. 6A-6D illustrate example graphical user interfaces including various example queue request notifications. FIGS. 6A-6D illustrate various graphical user interfaces including a variety of features and options in user interface elements. However, it will be appreciated that the transportation matching system 104 can provide the graphical user interfaces in accordance with a variety of alternate arrangements or elements.

In one or more embodiments, the transportation matching system 104 determines the prices for various options depicted in FIGS. 6A-6D utilizing queue modifiers, as discussed above with regard to FIG. 4. Additionally, in some embodiments, the transportation matching system 104 receives a transportation request to join a digital requestor queue in response to receiving an indication of user input at the various options depicted in FIGS. 6A-6D.

Figure 6B:
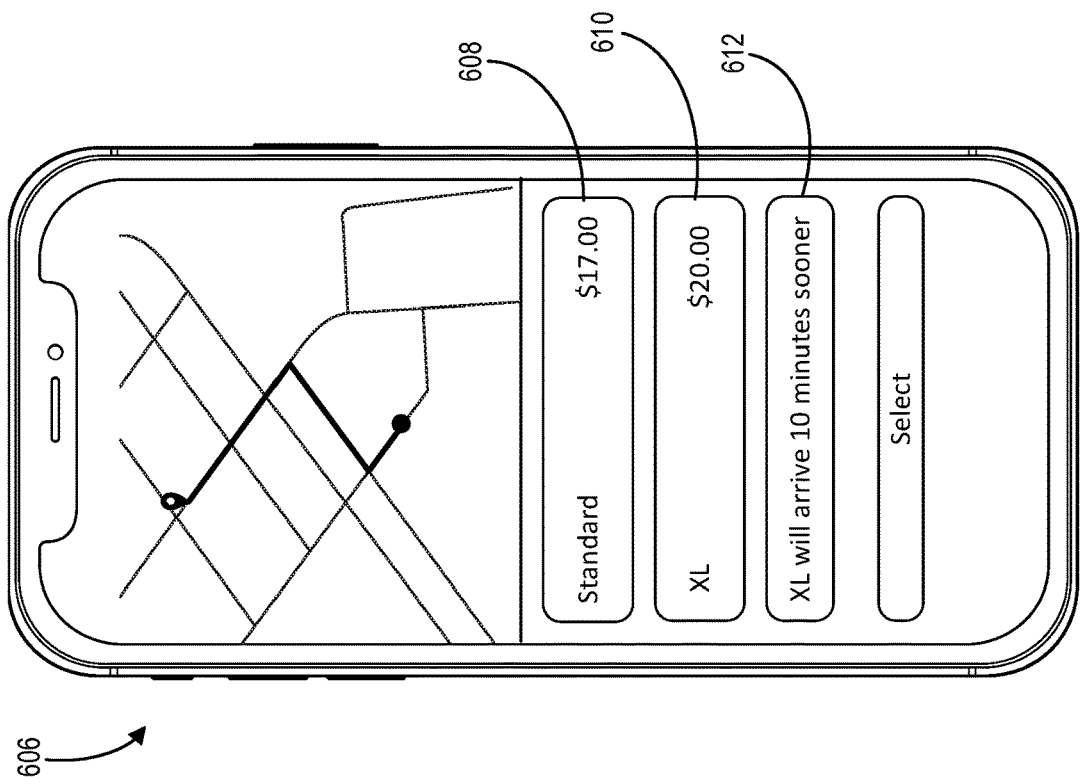
FIGS. 6A-6D illustrate example graphical user interfaces for providing a queue request notification in accordance with one or more embodiments.
Figure 6A:
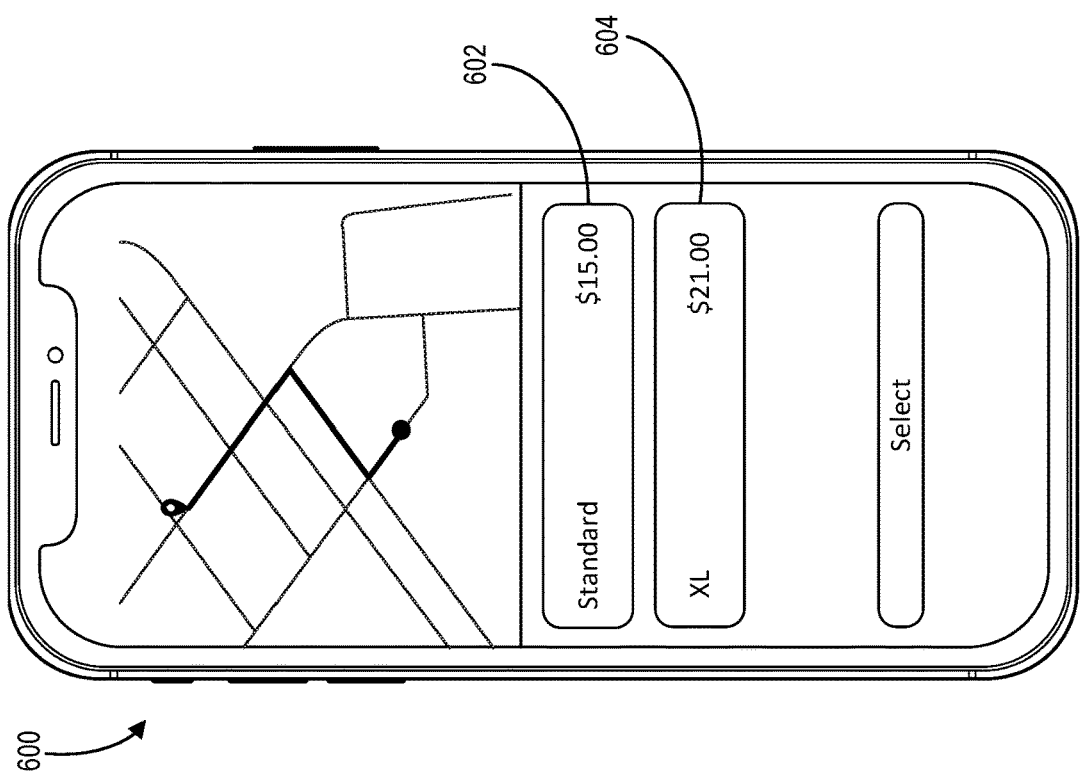

Turning to FIG. 6A, the transportation matching system 104 can provide, and a requestor device can present, a graphical user interface 600. More specifically, the transportation matching system 104 can provide, and the requestor device can present, a queue request notification with information and options regarding a potential transportation request as part of the graphical user interface 600. More specifically, the graphical user interface 600 includes a standard option 602 and an alternate option 604. In one or more embodiments, the standard option 602 and the alternate option 604 are a queue request notification. As shown in FIG. 6A, the standard option 602 and the alternate transportation request include a price for the potential transportation request.

As shown in FIG. 6A, the alternate option 604 includes the text "XL," indicating matching a provider device associated with a vehicle with larger capacity than is standard. However, the alternate option 604 can also reflect other transportation options, such as a shorter wait time, a closer pick-up location (e.g. an on-site pick-up location instead of a remote pick-up location), a more luxurious transportation vehicle, or a vehicle with additional or specialized storage capacity. Additionally, FIG. 6A illustrates the graphical user interface 600 including one alternate option 604. However, the transportation matching system 104 can provide a variety of numbers of alternate options in the graphical user interface 600.

Turning to FIG. 6B, a graphical user interface 606 includes a queue request notification with information and options corresponding to a potential transportation request. As shown in FIG. 6B, the graphical user interface 606 includes a standard option 608 and an alternate option 610. Further, the transportation matching system 104 can provide, and accordingly the graphical user interface 606 can include, an additional option information component 612. In some embodiments, the queue request notification includes the standard option 608, the alternate option 610, and the additional option information component 612.

In some embodiments, the additional option information component 612 includes information about an available option for the potential transportation request. As illustrated in FIG. 6B, the additional option information component 612 includes the text "XL will arrive 10 minutes sooner." The additional option information component 612 can also include information directing attention to relative prices of different options, describing the relative value of different options, or indicating another benefit of one option over another option. Accordingly, the transportation matching system 104 can utilize the additional option information component 612 to control the digital requestor queues corresponding to various options.

Figure 6D:
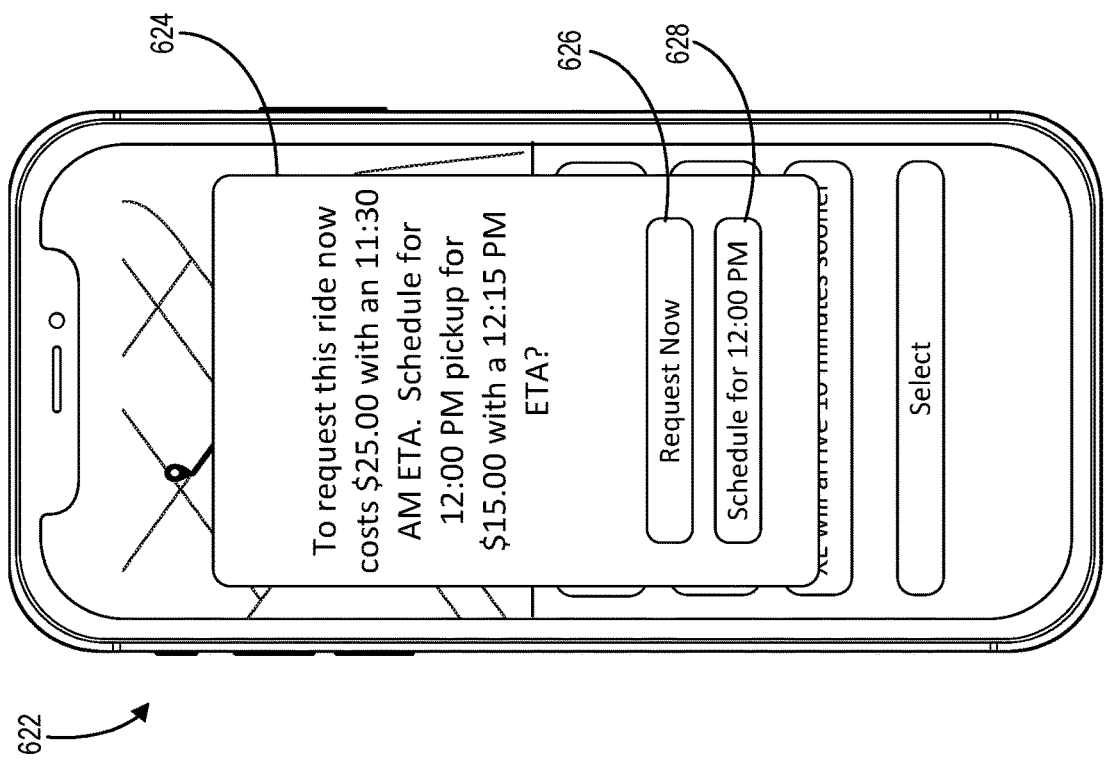
Figure 6C:
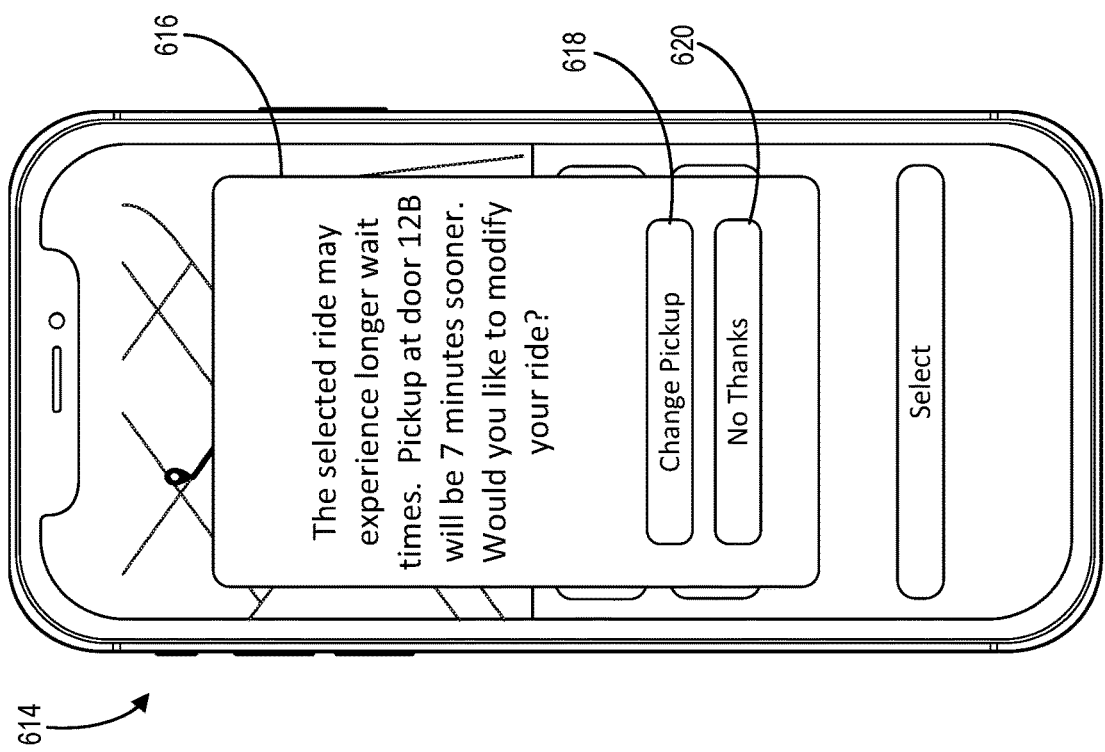

As discussed above, in one or more embodiments, the transportation matching system 104 generates and provides queue request notifications providing an option to modify a transportation request. As shown in FIG. 6C, the graphical user interface 614 includes the queue request notification 616. The queue request notification 616 includes information about an open transportation request and an option to modify a transportation request from one pick-up location to another pick-up location. FIG. 6C illustrates the queue request notification 616 including the text "The selected ride may experience longer wait times. Pickup at door 12B will be 7 minutes sooner. Would you like to modify your ride?"

However, the queue request notification 616 can include information about a variety of ride modifications, such as a ride modification to an alternate type of transportation (e.g. XL, Luxury). Additionally, it will be appreciated that the queue request notification 616 can include information about, and options to make, multiple ride modifications at once. The transportation matching system 104 can selectively provide a variety of options (e.g., based on likelihood of conversion, individual profile information, ETA, throughput, etc.). Moreover, the transportation matching system 104 can further provide options to accept some but not all potential modifications.

As shown in FIG. 6C, the queue request notification 616 can include an accept modification option 618 and a deny modification option 620. As shown in FIG. 6C, the accept modification option 618 includes the text "Change Pickup." In one or more embodiments, based on receiving an indication of user interaction with the accept modification option 618, the transportation matching system 104 can implement the modification to the transportation request. For example, the transportation matching system 104 can move the requestor device to an alternate digital requestor queue based on receiving an indication of user interaction at the accept modification option 618.

As also shown in FIG. 6C, the deny modification option 620 includes the text "No Thanks." In one or more embodiments, based on receiving an indication of user interaction at the deny modification option 620, the transportation matching system 104 can decline to implement the suggested modifications to the transportation request. For example, the transportation matching system 104 can maintain the requestor device's position in its current digital requestor queue.

As also discussed above, the transportation matching system 104 can provide a queue request notification including an option to schedule a transportation request for a pick-up at a future time rather than as soon as possible. For example, FIG. 6D illustrates a graphical user interface 622 including a queue request notification 624. The queue request notification 624 provides information and an option to schedule a pick-up for a future time. In one or more embodiments, the transportation matching system 104 determines the future time based on throughput predictions discussed above with regard to FIG. 3 or other forecast models (e.g., forecasted demand at a future time and a forecasted queue). As shown in FIG. 6D, the queue request notification 624 includes the text "To request this ride now costs $25.00 with an 11:30 AM ETA. Schedule for 12:00 PM pickup for $15.00 with a 12:15 PM ETA?" However, the queue request notification 624 can include information corresponding to a variety of transportation requests.

As illustrated in FIG. 6D, the queue request notification 624 includes the request now option 626 and the schedule later option 628. As also illustrated in FIG. 6D, the request now option 626 includes the text "Request Now." In one or more embodiments, based on receiving an indication of user input at the request now option 626, the transportation matching system 104 places the requestor device in a digital requestor queue.

As shown in FIG. 6D, the schedule later option 628 includes the text "Schedule for 12:00 PM." However, the schedule later option 628 can include scheduling information specific to a variety of potential modifications to a transportation request. In some embodiments, in response to receiving an indication of user interaction at the schedule later option 628, the transportation matching system 104 places the requestor device into a scheduled and/or delayed digital requestor queue.

As discussed above, the transportation matching system 104 can utilize a congestion model to make a variety of determinations regarding a congested venue, including determining causes or sources of limitations to throughput rate or determining wait time thresholds, queue thresholds, and/or predicted throughput rates. For example, FIG. 7 illustrates the transportation matching system 104 utilizing a congestion model 700 to determine the cause of throughput rate limitations at an example location.

Figure 7A:
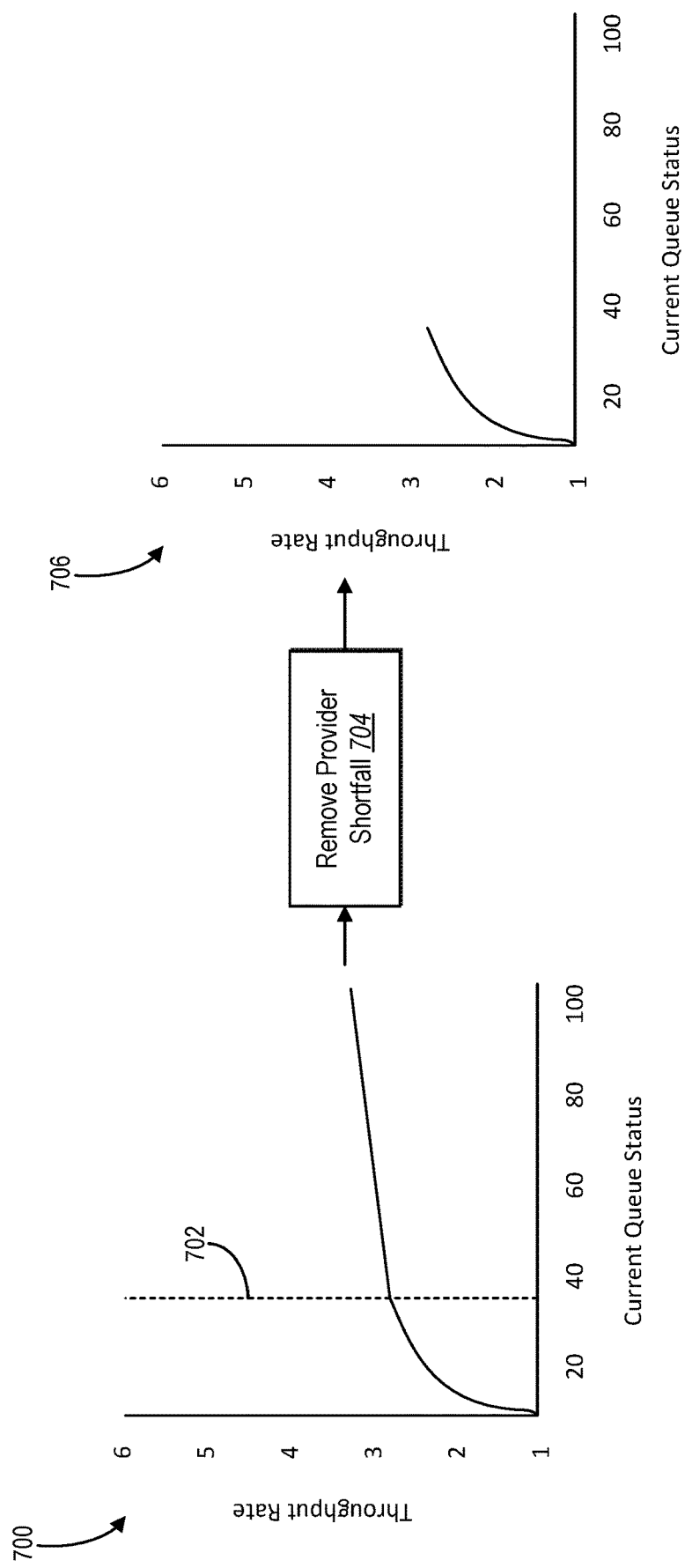
FIGS. 7A-7B illustrate a diagram of evaluating congestion at a location in accordance with one or more embodiments.

As mentioned previously, throughput rate can be limited at a particular venue for a variety of reasons, including provider device shortfall (e.g., a lack of throughout based on too few provider devices), congestion (e.g., a lack of throughout based on physical constraints, such as construction, lack of lanes, or traffic), and/or requestor device shortfall (e.g., a lack of throughput based on too few requestor devices). The transportation matching system 104 can utilize a congestion model to analyze throughput rates at a particular location and/or at a particular pick-up location to determine one or more limiting factors corresponding to a particular location. For instance, as shown in FIG. 7A, the congestion model 700 includes the throughput rate as a number of pick-ups performed per minute for the location mapped against a current queue status as a number of requestor devices in a digital requestor queue. In this example, the throughput rate increases significantly between a current queue status of zero and a current queue status of approximately 38. However, at a current queue status of approximately 38 and higher, the throughput rate increases much less rapidly.

Accordingly, the transportation matching system 104 can determine that the congestion model 700 includes an inflection point of 702 of approximately 38. That is, after the inflection point 702, an increase in the number of open transportation requests does not yield a significant increased throughput rate relative to the change prior to the inflection point. However, this information alone does not inform the transportation matching system 104 as to the source of such limitations.

Thus, the transportation matching system 104 can perform an act 704 of removing provider shortfall. More specifically, the transportation matching system 104 can remove data points from times at which there was a deficit of available provider devices to match with requestor devices from the congestion model 700. More specifically, the transportation matching system 104 can identify data points from the congestion model that occurred at a time when the transportation matching system 104 experienced a deficit of provider devices.

Accordingly, the transportation matching system 104 generates a modified congestion model 706. As shown in FIG. 7A, the modified congestion model 706 does not include data points where the current queue status exceeds 40 open requests. The transportation matching system 104 can analyze the modified congestion model 706 and determine, based on this information, that throughput limitations at the location is due to a deficit of provider devices. That is, for this location, instances where the transportation matching system 104 is unable to move matched provider devices and requestor devices through the location proportionally to the number of open requests are primarily due to a lack of available provider devices at the location.

Figure 7B:
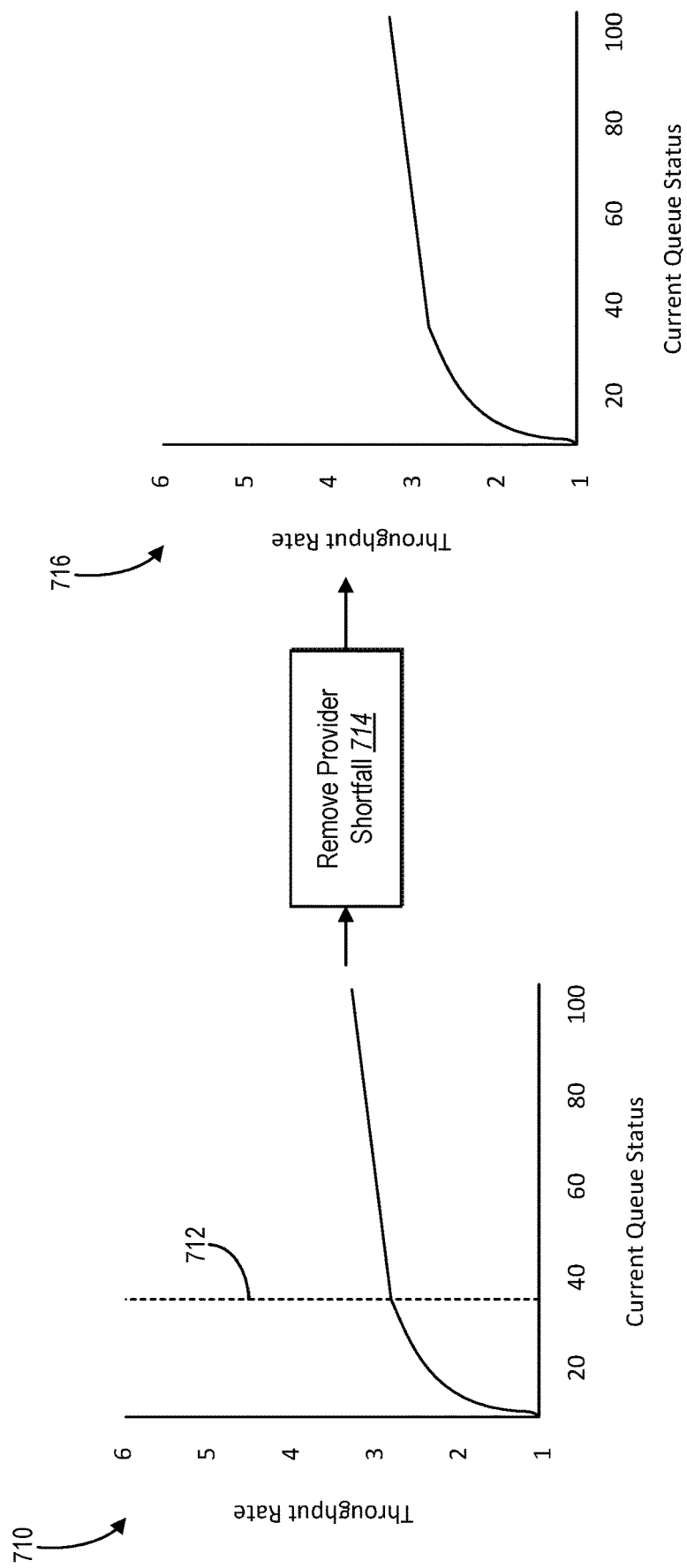

FIG. 7B illustrates an alternate scenario in which limitations to a throughput rate are primarily due to congestion at the location rather than due to provider shortfall. For example, the transportation matching system 104 can analyze the congestion model 710 to determine the inflection point 712. As above, the inflection point 712 represents a point at which throughput is limited and additional requestor devices in a digital requestor queue do not yield a higher throughput rate.

Further, similar to FIG. 7A, FIG. 7B includes an act 714 of removing provider shortfall. That is, the transportation matching system 104 removes data points from the congestion model 710 corresponding to times at which there was a deficit of available provider devices to match with requestor devices. More specifically, the transportation matching system 104 can identify data points from the congestion model that occurred at a time when the transportation matching system 104 experienced a deficit of provider devices.

Accordingly, the transportation matching system 104 generates a modified congestion model 716. As shown in FIG. 7B, the modified congestion model 716 includes similar throughput limitations to the congestion model 716. That is, the removal of a deficit of provider devices at the location as a factor does not show a threshold deviation in the throughput limitations in the congestion model 716. The transportation matching system 104 can analyze the modified congestion model 716 and determine, based on this information, that throughput limitations at the location is due to congestion at the location. That is, for this location, instances where the transportation matching system 104 is unable to move matched provider devices and requestor devices through the location proportionally to the number of open requests are primarily due to a lack of available provider devices at the location.

Additionally, the transportation matching system 104 can identify a scenario where a modified congestion model shows a limited improvement in throughput rate limitations over the congestion model. In such a situation, the transportation matching system 104 can determine that the throughput rate limitations are based on both provider device deficit and congestion at the location. In one or more embodiments, the transportation matching system 104 may utilize thresholds to determine a sufficient improvement for throughput rate limitations in a modified congestion model for a congestion-based location, a mixed influence location, and a provider deficit-based location.

In some embodiments, a congestion-based location primarily experiences throughput limitations as a result of congestion at the location (e.g. traffic conditions, limited curb space, and other physical limitations. Additionally, in one or more embodiments, a provider deficit-based location primarily experiences throughput limitations as a result of a shortfall of provider devices at a location relative to requestor devices. Further, a mixed influence location can experience throughput limitations not primarily due to any one factor, but as the result of a mix of congestion and provider device shortfall. Additionally, a mixed influence location may experience different primary influences at different times of the day, week, month, or year.

The transportation matching system 104 can utilize information about the causes of throughput limitations at the location to further inform queue modifiers, provider incentives, and/or queue request notifications, corresponding to the location. For example, in one or more embodiments, based on determining that a location is limited by provider deficit, the transportation matching system 104 can determine to provide additional incentive to providers to provide at the location during high demand times. In another example, the transportation matching system 104 can, based on determining that congestion severely limits throughput rate at a location, utilize throughput rate to provide additional queue request notifications to requestor devices.

Additionally, in one or more embodiments, the transportation matching system 104 can determine the wait time threshold and/or queue threshold for a location based in part on the inflection point of a congestion model corresponding to that location. Indeed, as mentioned above, the inflection point reflects a current queue status, beyond which, adding additional requestor devices will not show a threshold deviation in the throughput rate. Accordingly, in one or more embodiments, the transportation matching system 104 can utilize an inflection point of a congestion model as a queue threshold for the location. Accordingly, the transportation matching system 104 can prevent the corresponding digital requestor queue at the location from reaching a number of provider devices in the digital requestor queue at which it may experience throughput limitations.

In addition, or in the alternative, the transportation matching system 104 can utilize the inflection point to determine a wait time threshold. In some embodiments, the transportation matching system 104 can determine a wait time threshold based on a current queue status at the inflection point of a congestion model together with the throughput rate at the inflection point. Indeed, by applying the throughput rate and the current queue status, the transportation matching system 104 can determine a wait time corresponding to the inflection point. The transportation matching system 104 can utilize this wait time as the threshold wait time described previously.

Additionally, in one or more embodiments, the system also utilizes a congestion model to predict a throughput rate at a location. For example, the transportation matching system 104 can determine a current queue status at the location and can utilize the corresponding throughput rate on the congestion model as the throughput rate for the location. The transportation matching system 104 can utilize this determination in addition or in the alternative to utilization of real-time data from provider devices and requestor devices at the location.

As discussed above, the transportation matching system 104 can also determine a queue threshold and/or wait time threshold based on a requestor device retention model. FIG. 8 illustrates the transportation matching system 104 determining a wait time threshold (and/or queue threshold) in accordance with one or more embodiments. More specifically, FIG. 8 illustrates a congestion model 800 including both throughput rate over current queue status and a requestor device retention metric over current queue status.

In one or more embodiments, a requestor device retention metric reflects damage to future potential transportation requests associated with a requester device. The requestor device retention metric can include a variety of specific retention values. For example, in some embodiments, the requestor device retention metric reflects a change in the number of transportation requests by a requestor at a location within a 91 day window (e.g., requests in the previous 91 days prior to a ride compared to requests in the 91 days after a ride). In some embodiments, the requestor device retention metric reflects a cancellation rate (e.g., cancellation from a transportation matching application). In other embodiments, the requestor device retention metric reflects both cancellation rate and a change in the number of transportation requests over time.

Figure 8:
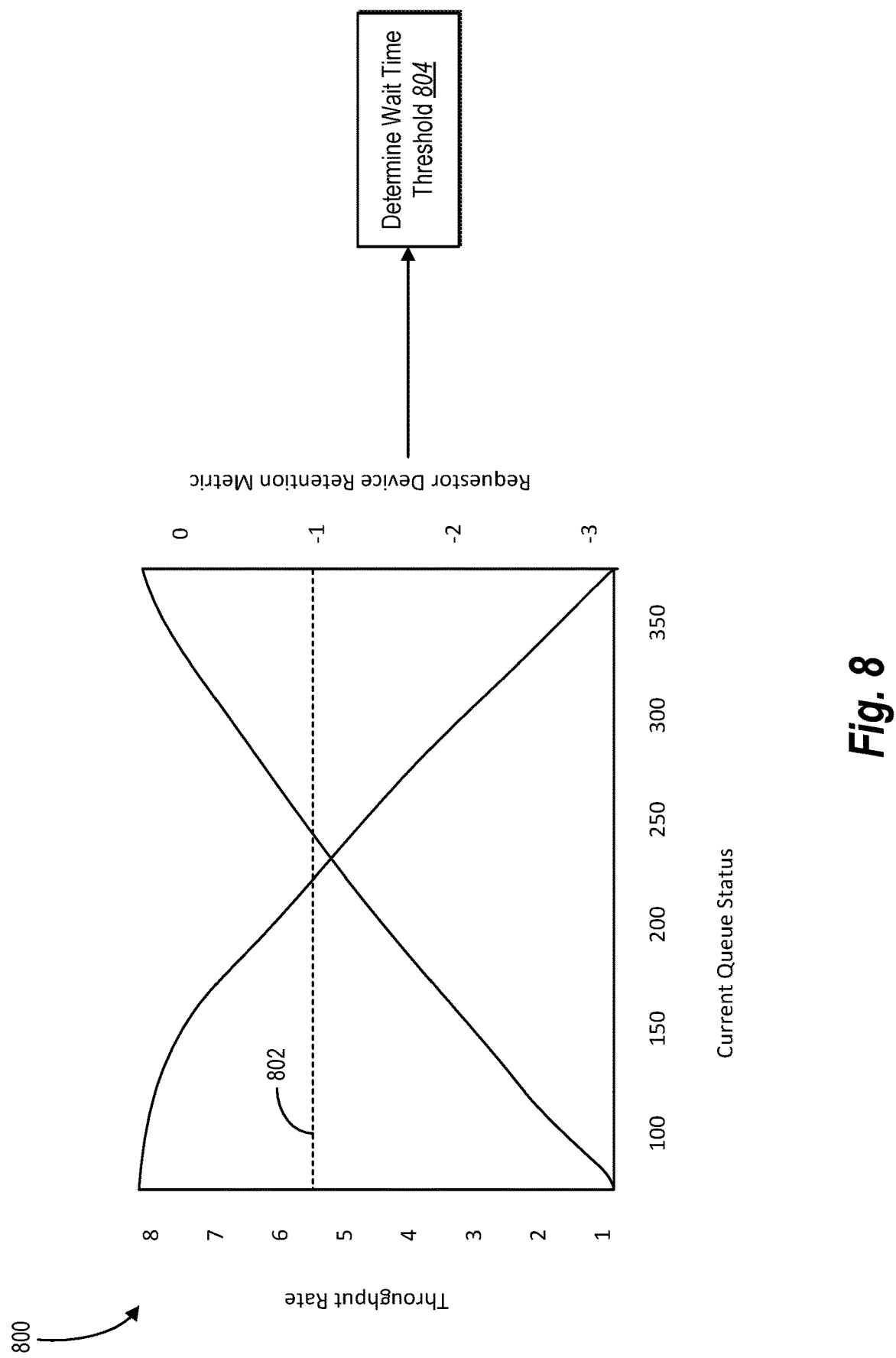
FIG. 8 illustrates a diagram of determining a wait time threshold for a location in accordance with one or more embodiments.

For example FIG. 8 illustrates the requestor device retention metric where a more negative score indicates reduced retention of the requestor device for the transportation matching system over time. For example, the requestor device retention metric may measure a decrease in transportation requests over a 91 day period. As shown in FIG. 8, the requestor device retention metric becomes more negative as current queue status increases in a number of open requests. That is, as more requestor devices are in a digital requestor queue, those requestor devices are less likely to utilize the transportation matching system 104 in the future.

Accordingly, the transportation matching system 104 can utilize a requestor device retention threshold 802. As shown in FIG. 8, the requestor device retention threshold 802 is -1. However, the transportation matching system 104 can utilize a variety of values as the requestor device retention threshold 802. In some embodiments, the transportation matching system 104 can determine an individual device retention threshold for individual requestor devices. For example, the transportation matching system 104 can determine a higher requestor device retention threshold for requestor devices with a premium membership. In another example, the transportation matching system 104 can determine a lower requestor device retention threshold for a user with a historical behavior indicating a willingness to wait longer periods of time. Thus, the transportation matching system 104 can utilize requestor device information to determine queue request notifications for individual requestor devices.

Further, in one or more embodiments, the transportation matching system 104 can determine a requestor device retention threshold 802 based on administrator input. Additionally, the transportation matching system 104 can determine a requestor device retention threshold 802 based at least in part on the characteristics of requestor devices typical to the location. For example, the transportation matching system 104 can determine that requestor devices typical to the location are more likely to be long-term users of the transportation matching system 104, are more likely to utilize particular transportation options, etc. Further, the transportation matching system 104 can determine a throughput rate associated with the requestor device retention threshold 802. As shown in FIG. 8, the throughput rate is approximately 5.5 at the requestor device retention threshold 802.

The transportation matching system 104 can, based on a congestion model and/or a retention model, perform an act 804 of determining a wait time threshold. As shown in FIG. 8, the congestion model reflects a throughput rate associated with various current queue statuses. The congestion model in FIG. 8 shows an increase in throughput rate as current queue status increases. As also shown in FIG. 8, the retention model reflects a requestor device retention metric across various current queue statuses. The retention model in FIG. 8 shows an increasingly negative requestor device retention metric as current queue status increases.

In one or more embodiments, the transportation matching system 104 determines the wait time threshold utilizing both the congestion model and the retention model. To illustrate, the transportation matching system 104 can utilize the retention model to determine a current queue status at the requestor device retention threshold 802. Further, the transportation matching system 104 can utilize the congestion model to determine a throughput rate at that current queue status. The transportation matching system 104 can determine a wait time associated with that throughput rate and queue length, and can utilize the result as the wait time threshold. Further, in some embodiments, the transportation matching system 104 can utilize historical data to determine wait times at the queue length for the requestor device retention threshold 802.

In one or more alternate embodiments, the transportation matching system 104 can utilize the retention model alone to determine the wait time threshold. For example, the transportation matching system 104 can utilize the retention model to determine a current queue status associated with the device retention threshold 802. Then, the transportation matching system 104 can determine a wait time associated with the current queue status. For example, the transportation matching system 104 can utilize historical data to identify a set of data points associated with that current queue status. Further, the transportation matching system 104 can determine a wait time based on the average of the wait times associated with that set of data points. Additionally, in one or more embodiments, the transportation matching system 104 can generate a curve reflecting wait times over various queue statuses and can utilize that curve to determine the wait time. Accordingly, the transportation matching system 104 can utilize that wait time as the wait time threshold.

In one or more embodiments, the wait time threshold can represent the maximum amount of time that requestor devices, in the aggregate, can wait at the location without experiencing the threshold amount of damage to requestor device retention as measured by the requestor device retention metric. Thus, the transportation matching system 104 can utilize control of digital requestor queues to keep damage to requestor device retention to a minimum acceptable level.

Although the foregoing description largely discusses determining a wait time threshold, the transportation matching system 104 can also determine a queue threshold utilizing a retention model. For example, the transportation matching system 104 can identify the number of requestor devices where the retention model intersects the requestor device retention threshold 802. The transportation matching system 104 can utilize the number of requestor devices as the queue threshold. In other embodiments, the transportation matching system 104 utilizes the wait time threshold to determine a queue threshold (e.g., by multiplying the wait time threshold by a throughput rate).

Moreover, although FIG. 8 illustrates determining a wait time threshold and/or queue threshold based on a retention model reflecting a number of requestor devices in a digital requestor queue, the transportation matching system 104 can also utilize other retention models. For example, the transportation matching system 104 can generate a retention model that reflects retention based on changes in transportation value (e.g. changes in price of transportation services). Indeed, price of transportation services can also impact retention (e.g., increased price can lead to a significant reduction in long-term retention over time). Accordingly, the transportation matching system 104 can account for retention loss resulting from increased price as well as retention loss resulting from increased wait time/increased number of requestor devices. To illustrate, the transportation matching system 104 can generate retention models resulting from changes in transportation value and/or retention models resulting from changes in a number of requestor devices in a requestor queue and utilize the retention models to select maximum wait times, queue thresholds, or queue modifiers.

Indeed, in generating queue request notifications, the transportation matching system can consider both of these types of retention models. For example, the transportation matching system can increase a maximum wait time and/or queue threshold (to decrease price and) to improve retention with regard to transportation value. Similarly, the transportation matching system can decrease maximum wait time and/or queue threshold to improve retention with regard to a number of requestor devices (e.g., excess wait time). In some embodiments, the transportation matching system 104 applies a transportation value threshold (e.g., a maximum price or a maximum queue threshold) that corresponds to a value retention threshold (e.g., a price that corresponds to −1.5 retention).

In other embodiments, the transportation matching system 104 identifies a common value retention threshold (e.g., an equilibrium retention loss) for retention models resulting from changes in transportation value and retention models resulting from changes in number of requestor devices in a requestor queue. To illustrate, the transportation matching system 104 can select a maximum wait time, a queue threshold, and/or a queue modifier that makes different retention models result in the same retention loss (e.g., retention loss due to cost equals retention loss due to wait time/ETA). Thus, the transportation matching system 104 can balance transportation value and wait time/queue length/ETA in generating queue request notifications (in addition to other factors discussed above, such as physical line limitations).

Figure 9:
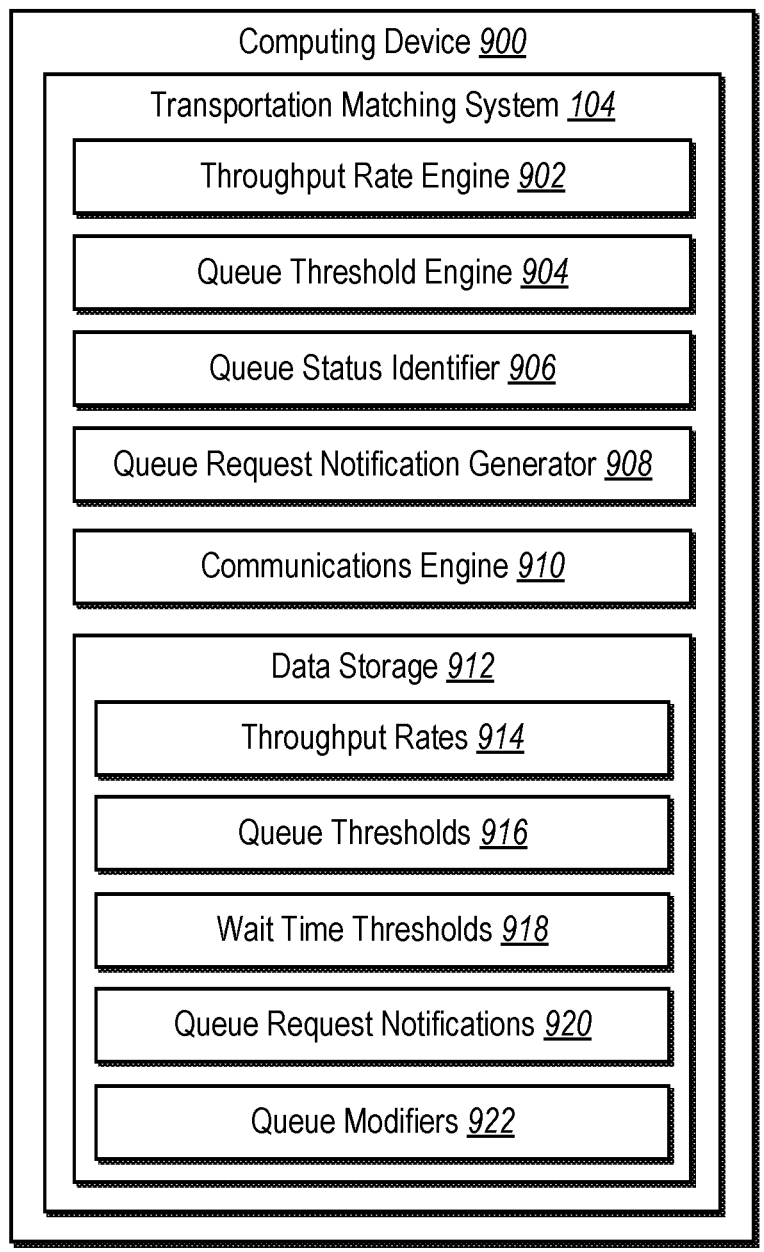
FIG. 9 illustrates a schematic diagram of a transportation matching system in accordance with one or more embodiments.

Turning to FIG. 9, additional detail will now be provided regarding various components and capabilities of the transportation matching system 104. In particular, FIG. 9 illustrates an example schematic diagram of the transportation matching system 104 implemented by a computing device 900 (e.g., the server(s) 102, the provider devices 106, and/or the requestor devices 110) in accordance with one or more embodiments of the present disclosure. As shown, the computing device 900 can implement the transportation matching system 104. Also illustrated, the transportation matching system 104 can include a throughput rate engine 902, a queue threshold engine 904, a queue status identifier 906, a queue request notification generator 908, a communications engine 910, and a data storage 912.

The computing device 900 includes the throughput rate engine 902. The throughput rate engine 902 can determine and predict throughput rates. The throughput rate engine 902 can track real-time GPS data and other data from provider devices and requestor devices at a location. Further, the throughput rate engine 902 can utilize real-time data to determine a current throughput rate for the location. Additionally, in one or more embodiments, the throughput rate engine 902 utilizes weather forecasts, event data, construction information, etc. to determine throughput rates and/or predict future throughput rates.

Also, as shown in FIG. 9, the computing device 900 includes the queue threshold engine 904. The queue threshold engine 904 can determine a queue threshold corresponding to a location at a particular time. In some embodiments, the threshold engine determines a queue threshold for a location based on a throughput rate corresponding to the location and a wait time threshold corresponding to the location. The queue threshold engine 904 can dynamically update the queue threshold based on real-time data for a location changing over time.

Further, as shown in FIG. 9, the computing device 900 includes the queue status identifier 906. The queue status identifier can identify a current queue status of a digital requestor queue. For example, the queue status identifier 906 can monitor a number of requestor devices in a digital requestor queue. In one or more embodiments, the queue status identifier 906 can monitor when requestors enter the digital requestor queue (e.g. submit or modify a transportation request) or exit the digital requestor queue (e.g. are picked up from a pick up location, cancel or modify a transportation request).

Additionally, as shown in FIG. 9, the computing device 900 includes the queue request notification generator 908. The queue request notification generator 908 can generate queue request notifications in response to transportation requests. The queue request notification generator 908 can generate queue request notifications based on a current queue status and a queue threshold. Additionally, the queue request notification generator 908 can utilize user data to generate queue request notifications. The queue request notification generator 908 can generate queue request notifications with a variety of options and information related to a transportation request and/or the state of an associated digital requestor queue.

As also shown in FIG. 9, the computing device 900 includes the communications engine 910. The communications engine 910 can provide communications to, and receive communications from, provider devices and requestor devices. For example, the communications engine 910 can receive transportation requests to requestor devices. Additionally, the communications engine can provide queue request notifications to requestor devices.

Further, as shown in FIG. 9, the computing device 900 includes the data storage 912. The data storage 912 maintains data for the transportation matching system 104. The data storage 912 (e.g., via one or more memory devices) can maintain data of any type, size, or kind, as necessary to perform the functions of the transportation matching system 104, including data received from third-party servers. For example, as shown in FIG. 9, the transportation matching system 104 can include throughput rates 914, queue thresholds 916, wait time thresholds 918, queue request notifications 920, and queue modifiers 922.

Each of the components 902-912 of the transportation matching system 104 can include software, hardware, or both. For example, the components 902-912 can include one or more instructions stored on a computer-readable storage medium and executable by processors of one or more computing devices, such as a client device or server device. When executed by the one or more processors, the computer-executable instructions of the transportation matching system 104 can cause the computing device(s) to perform the methods described herein. Alternatively, the components 902-912 can include hardware, such as a special-purpose processing device to perform a certain function or group of functions. Alternatively, the components 902-912 of the transportation matching system 104 can include a combination of computer-executable instructions and hardware.

Furthermore, the components 902-912 of the transportation matching system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-912 may be implemented as a stand-alone application, such as a desktop or mobile application. Furthermore, the components 902-912 may be implemented as one or more web-based applications hosted on a remote server. The components 902-912 may also be implemented in a suite of mobile device applications or "apps."

Figure 10:
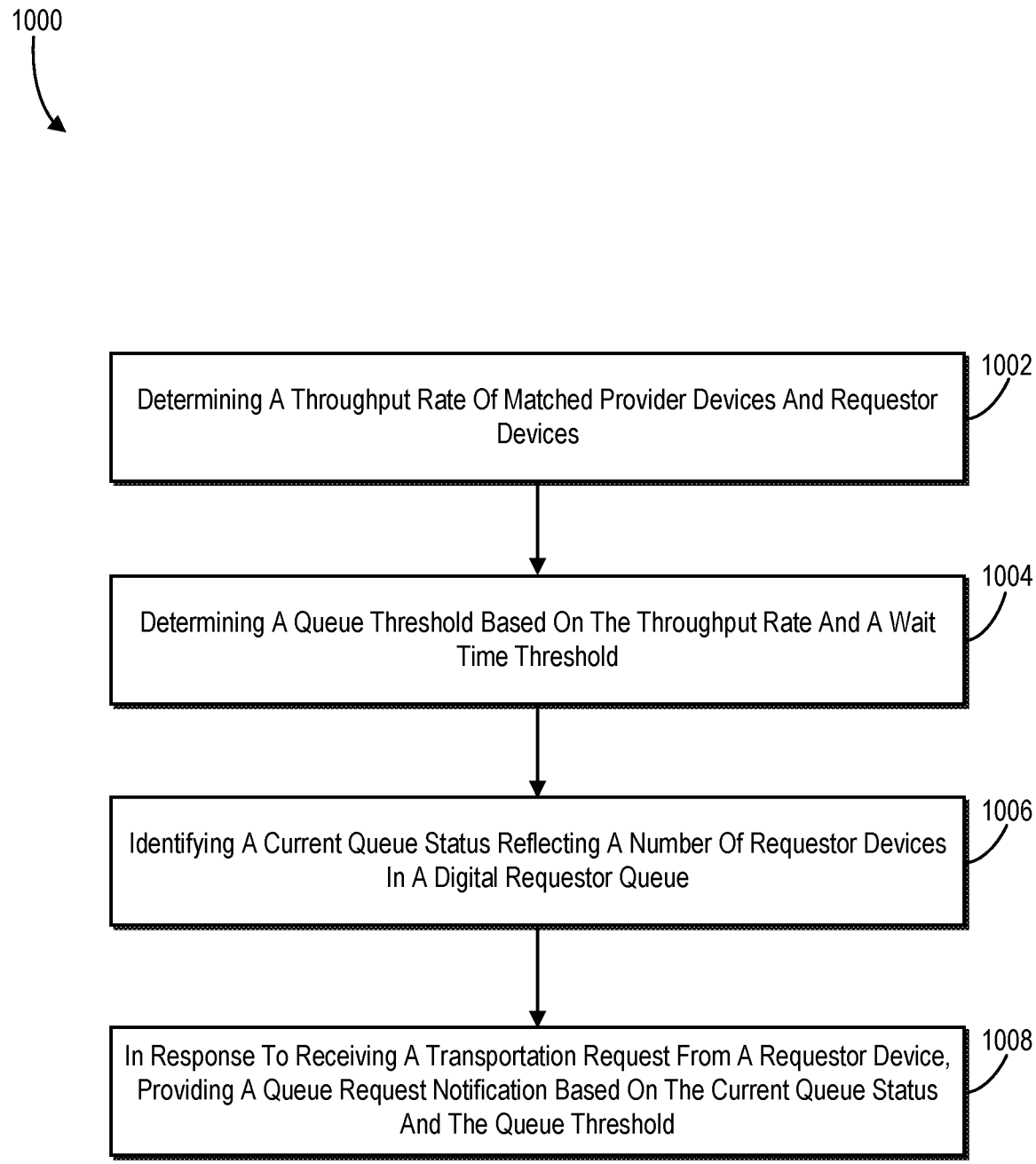
FIG. 10 illustrates a flowchart of a series of acts for providing a queue request notification in accordance with one or more embodiments.

FIGS. 1-9, the corresponding text, and the examples provide a number of different methods, systems, devices, and non-transitory computer-readable media of the transportation matching system 104. In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for providing a queue request notification in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1002 for determining a throughput rate of matched provider devices and requestor devices. In particular, the act 1002 can include determining a throughput rate of matched provider devices and requestor devices corresponding to a location.

Additionally, the series of acts 1000 includes an act 1004 for determining a queue threshold based on the throughput rate and a wait time threshold. In particular, the act 1004 can include determining a queue threshold corresponding to the location based on the throughput rate and a wait time threshold corresponding to the location. Specifically, the act 1004 can include generating a congestion model based on historical throughput rates and historical requestor devices corresponding to the location and determining the queue threshold based on an inflection point of the congestion model.

Also, the series of acts 1000 includes an act 1006 for identifying a current queue status reflecting a number of requestor devices in a digital requestor queue. In particular, the act 1006 can include identifying a current queue status reflecting a number of requestor devices in a digital requestor queue corresponding to the location.

Further, the series of acts 1000 includes an act 1008 for in response to receiving a transportation request from a requestor device, providing a queue request notification based on the current queue status and the queue threshold. In particular, the act 1008 can include in response to receiving a transportation request from a requestor device to be added to the digital requestor queue, providing, for display via a requestor user interface, a queue request notification based on the current queue status and the queue threshold. Specifically, the act 1008 can include determining a provider-based queue modifier based on a current number of provider devices, determining a throughput-based queue modifier based on the throughput rate, and providing the queue request notification based on the provider-based queue modifier and the throughput-based queue modifier.

The act 1008 can also include determining a combined queue modifier by combining the provider-based queue modifier and the throughput-based queue modifier utilizing the current queue status and the queue threshold and providing the queue request notification based on the combined queue modifier. Further, the act 1008 can include wherein the provider-based queue modifier comprises a first price modifier for adjusting a baseline transportation price based on the current number of provider devices, and the throughput-based queue modifier comprises a second price modifier for adjusting the baseline transportation price based on the throughput rate.

Additionally, the act 1008 can include comparing the combined queue modifier and the provider-based queue modifier to select a final queue modifier and providing the queue request notification based on the final queue modifier. The act 1008 can also include wherein the queue request notification comprises at least one of: a user interface element comprising a price; a user interface element comprising an alternate location; a user interface element comprising a request to join an alternate digital requestor queue; or a user interface element comprising a request to modify a pick-up time.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
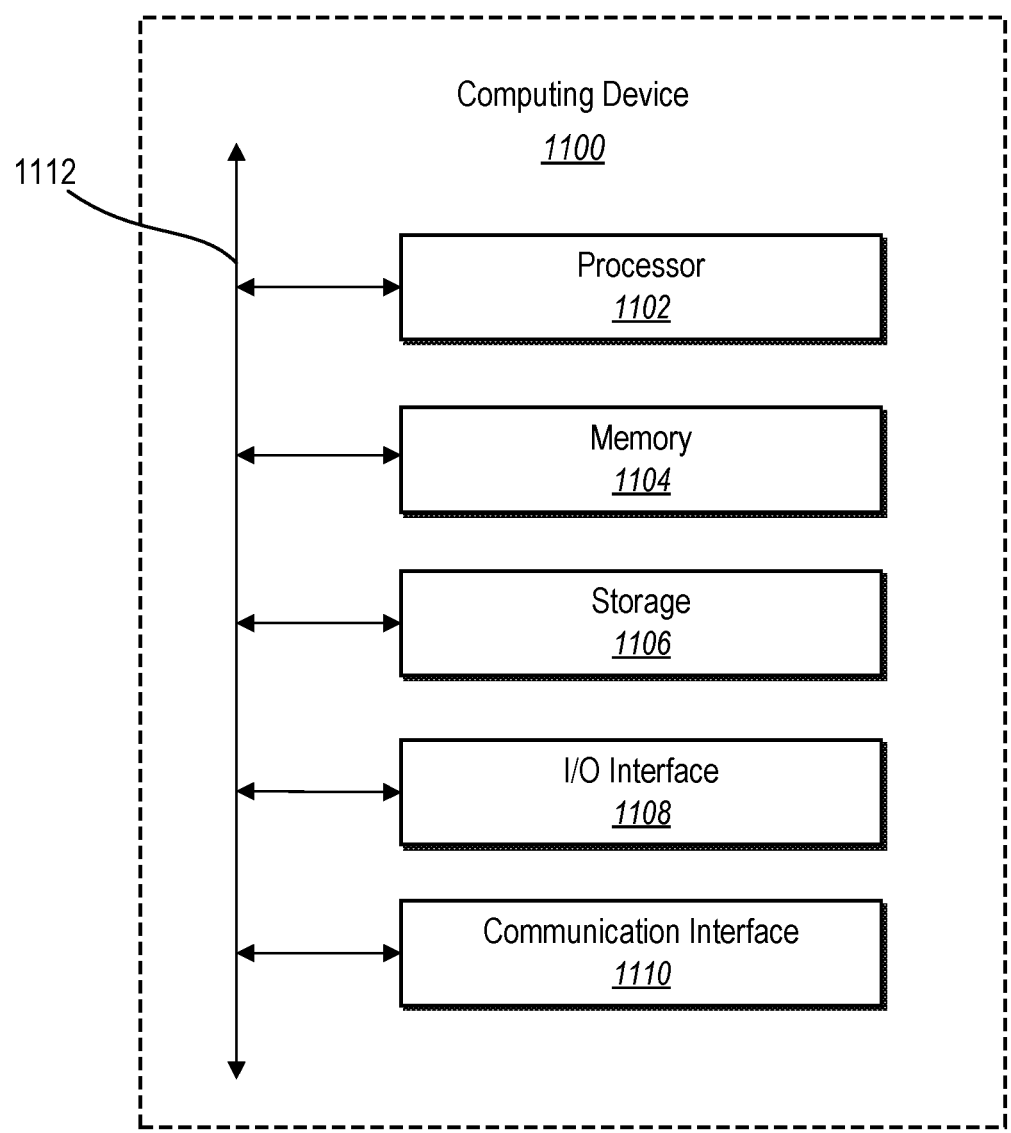
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., the computing device 900, the server(s) 102, the provider devices 106, requestor devices 110, the third-party server 116). In one or more embodiments, the computing device 1100 may be a mobile device (e.g., a mobile telephone, a smartphone, a PDA, a tablet, a laptop, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of the computing device 1100 to each other.

Figure 12:
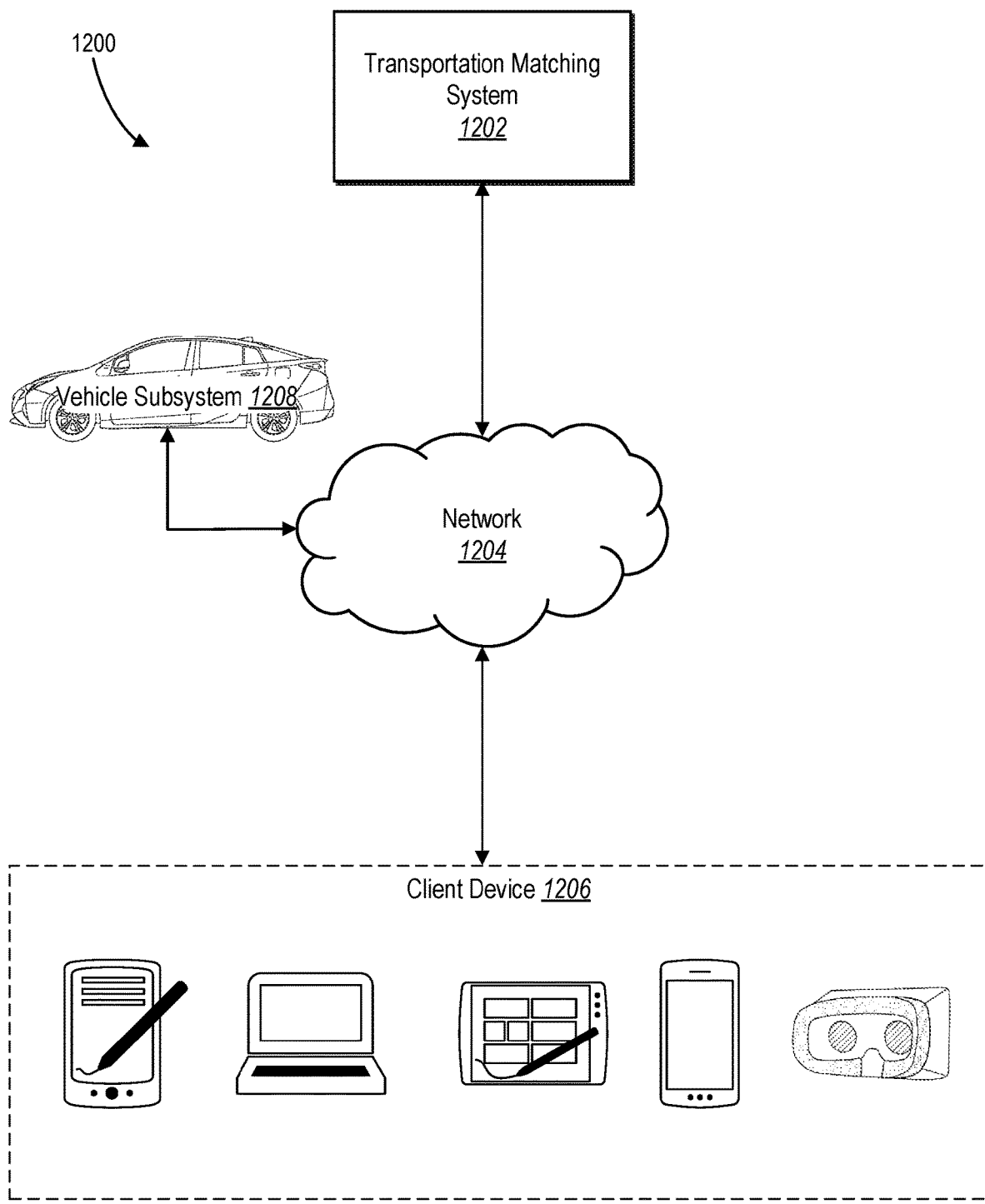
FIG. 12 illustrates an example network environment of a transportation matching system in accordance with one or more embodiments.

FIG. 12 illustrates an example network environment 1200 of a transportation matching system (e.g., the transportation matching system 104). The network environment 1200 includes a client device 1206, a transportation matching system 1202, and a vehicle subsystem 1208 connected to each other by a network 1204. Although FIG. 12 illustrates a particular arrangement of the client device 1206, the transportation matching system 1202, the vehicle subsystem 1208, and the network 1204, this disclosure contemplates any suitable arrangement of the client device 1206, the transportation matching system 1202, the vehicle subsystem 1208, and the network 1204. As an example, and not by way of limitation, two or more of the client devices 1206, the transportation matching system 1202, and the vehicle subsystem 1208 communicate directly, bypassing the network 1204. As another example, two or more of the client devices 1206, the transportation matching system 1202, and the vehicle subsystem 1208 may be physically or logically co-located with each other in whole or in part. Moreover, although FIG. 12 illustrates a particular number of the client devices 1206, the transportation matching systems 1202, the vehicle subsystems 1208, and the networks 1204, this disclosure contemplates any suitable number of the client devices 1206, the transportation matching systems 1202, the vehicle subsystems 1208, and the networks 1204. As an example, and not by way of limitation, the network environment 1200 may include multiple client devices 1206, the transportation matching systems 1202, the vehicle subsystems 1208, and the networks 1204.

This disclosure contemplates any suitable network 1204. As an example, and not by way of limitation, one or more portions of the network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1204 may include one or more networks 1204.

Links may connect the client device 1206, the transportation matching system 1202, and the vehicle subsystem 1208 to the communication network 1204 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1200. One or more first links may differ in one or more respects from one or more second links.

In particular embodiments, the client device 1206 may be an electronic device including hardware, software, or embedded logic components or a combination of two or more such components and capable of carrying out the appropriate functionalities implemented or supported by the client device 1206. As an example, and not by way of limitation, a client device 1206 may include any of the computing devices discussed above in relation to FIG. 12. A client device 1206 may enable a network user at the client device 1206 to access a network. A client device 1206 may enable its user to communicate with other users at other client devices 1206.

In particular embodiments, the client device 1206 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1206 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1206 one or more Hyper Text Markup Language (HTML) files responsive to the HTTP request. The client device 1206 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 1202 may be a network-addressable computing system that can host a ride share transportation network. The transportation matching system 1202 may generate, store, receive, and send data, such as, for example, user-profile data, concept-profile data, text data, ride request data, GPS location data, provider data, requestor data, vehicle data, or other suitable data related to the ride share transportation network. This may include authenticating the identity of providers and/or vehicles who are authorized to provide ride services through the transportation matching system 1202. In addition, the transportation service system may manage identities of service requestors such as users/requestors. In particular, the transportation service system may maintain requestor data such as driving/riding histories, personal data, or other user data in addition to navigation and/or traffic management services or other location services (e.g., GPS services).

In particular embodiments, the transportation matching system 1202 may manage ride matching services to connect a user/requestor with a vehicle and/or provider. By managing the ride matching services, the transportation matching system 1202 can manage the distribution and allocation of vehicle subsystem resources and user resources such as GPS location and availability indicators, as described herein.

The transportation matching system 1202 may be accessed by the other components of the network environment 1200 either directly or via network 1204. In particular embodiments, the transportation matching system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, or a transportation matching system 1202 to manage, retrieve, modify, add, or delete, the information stored in data store.

In particular embodiments, the transportation matching system 1202 may provide users with the ability to take actions on various types of items or objects, supported by the transportation matching system 1202. As an example, and not by way of limitation, the items and objects may include ride share networks to which users of the transportation matching system 1202 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 1202 or by an external system of a third-party system, which is separate from the transportation matching system 1202 and coupled to the transportation matching system 1202 via a network 1204.

In particular embodiments, the transportation matching system 1202 may be capable of linking a variety of entities. As an example, and not by way of limitation, the transportation matching system 1202 may enable users to interact with each other or other entities, or to allow users to interact with these entities through an application programming interfaces (API) or other communication channels.

In particular embodiments, the transportation matching system 1202 may include a variety of servers, sub-systems, programs, modules, logs, and data stores. In particular embodiments, the transportation matching system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 1202 may also include suitable components such as network interfaces, security mechanisms, load balancers, failover servers, management-and-network-operations consoles, other suitable components, or any suitable combination thereof. In particular embodiments, the transportation matching system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 1202 and one or more client devices 1206. An action logger may be used to receive communications from a web server about a user's actions on or off the transportation matching system 1202. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from the client device 1206 responsive to a request received from the client device 1206. Authorization servers may be used to enforce one or more privacy settings of the users of the transportation matching system 1202. A privacy setting of a user determines how particular information associated with a user can be shared. The authorization server may allow users to opt in to or opt out of having their actions logged by the transportation matching system 1202 or shared with other systems, such as, for example, by setting appropriate privacy settings. Third-party-content-object stores may be used to store content objects received from third parties. Location stores may be used for storing location information received from the client devices 1206 associated with users.

In addition, the vehicle subsystem 1208 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1208 can include an autonomous vehicle—i.e., a vehicle that does not require a human operator. In these embodiments, the vehicle subsystem 1208 can perform maneuvers, communicate, and otherwise function without the aid of a human provider, in accordance with available technology.

In particular embodiments, the vehicle subsystem 1208 may include one or more sensors incorporated therein or associated thereto. For example, sensor(s) can be mounted on the top of the vehicle subsystem 1208 or else can be located within the interior of the vehicle subsystem 1208. In certain embodiments, the sensor(s) can be located in multiple areas at once— i.e., split up throughout the vehicle subsystem 1208 so that different components of the sensor(s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requestor.

In particular embodiments, the vehicle subsystem 1208 may include a communication device capable of communicating with the client device 1206 and/or the transportation matching system 1202. For example, the vehicle subsystem 1208 can include an on-board computing device communicatively linked to the network 1204 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   determining a throughput rate corresponding to a location by determining a rate of fulfilled transportation requests at the location;
   determining a queue threshold corresponding to the location based on the throughput rate of fulfilled transportation requests at the location, wherein the queue threshold represents a maximum number of devices in a digital requestor queue for the location;
   identifying a current requestor queue status reflecting a number of requestor devices in a digital requestor queue for the location; and
   in response to receiving a transportation request from a requestor device, providing, for display via a requestor user interface, a queue request notification based on the current requestor queue status and the queue threshold.

2. The method of claim 1, wherein providing the queue request notification comprises:
   determining a provider-based queue modifier based on a current number of provider devices;
   determining a throughput-based queue modifier based on the throughput rate; and
   providing the queue request notification based on the provider-based queue modifier and the throughput-based queue modifier.

3. The method of claim 2, further comprising:
   determining a combined queue modifier based on the provider-based queue modifier and the throughput-based queue modifier; and
   providing the queue request notification based on the combined queue modifier.

4. The method of claim 3 wherein:
   the provider-based queue modifier comprises a first price modifier for adjusting a baseline transportation price based on the current number of provider devices; and
   the throughput-based queue modifier comprises a second price modifier for adjusting the baseline transportation price based on the throughput rate.

5. The method of claim 3, further comprising:
   selecting a final queue modifier based on the combined queue modifier and the provider-based queue modifier; and
   providing the queue request notification based on the final queue modifier.

6. The method of claim 1, wherein the queue request notification comprises at least one of: a user interface element comprising a price; a user interface element comprising an alternate location; a user interface element comprising a request to join an alternate digital requestor queue; or a user interface element comprising a request to modify a pick-up time.

7. The method of claim 1, wherein determining the queue threshold comprises:
   generating a congestion model based on historical throughput rates and historical requestor devices corresponding to the location; and
   determining the queue threshold based on an inflection point of the congestion model.

8. A non-transitory computer-readable medium storing instructions that, when executed by at least one processor, cause a computer system to:
   determine a throughput rate corresponding to a location by determining a rate of fulfilled transportation requests at the location;
   determine a queue threshold corresponding to the location based on the throughput rate of fulfilled transportation requests at the location, wherein the queue threshold represents a maximum number of devices in a digital requestor queue for the location;
   identify a current requestor queue status reflecting a number of requestor devices in a digital requestor queue for the location; and
   in response to receiving a transportation request from a requestor device, provide, for display via a requestor user interface, a queue request notification based on the current requestor queue status and the queue threshold.

9. The non-transitory computer-readable medium of claim 8, further comprising instructions that, when executed by the at least one processor, cause the computer system to provide the queue request notification by:
   determining a provider-based queue modifier based on a current number of provider devices;
   determining a throughput-based queue modifier based on the throughput rate; and
   providing the queue request notification based on the provider-based queue modifier and the throughput-based queue modifier.

10. The non-transitory computer-readable medium of claim 9, further comprising instructions that, when executed by the at least one processor, cause the computer system to:

determine a combined queue modifier based on the current requestor queue status and the queue threshold; and provide the queue request notification based on the combined queue modifier.

11. The non-transitory computer-readable medium of claim 10, further comprising instructions that, when executed by the at least one processor, cause the computer system to:
select a final queue modifier by comparing the combined queue modifier and the provider-based queue modifier; and
provide the queue request notification based on the final queue modifier.

12. The non-transitory computer-readable medium of claim 8, further comprising instructions that, when executed by the at least one processor, cause the computer system to determine the queue threshold further based on a wait time threshold for the location.

13. The non-transitory computer-readable medium of claim 8, further comprising instructions that, when executed by the at least one processor, cause the computer system to determine the location based on a geographical radius.

14. The non-transitory computer-readable medium of claim 8, further comprising instructions that, when executed by the at least one processor, cause the computer system to determine the queue threshold by:
generating a congestion model based on historical throughput rates and historical requestor devices corresponding to the location; and
determining the queue threshold based on an inflection point of the congestion model.

15. A system comprising:
at least one processor; and
at least one non-transitory computer-readable storage medium storing instructions that, when executed by the at least one processor, cause the system to:
determine a throughput rate corresponding to a location by determining a rate of fulfilled transportation requests at the location;
determine a queue threshold corresponding to the location based on the throughput rate of fulfilled transportation requests at the location, wherein the queue threshold represents a maximum number of devices in a digital requestor queue for the location;
identify a current requestor queue status reflecting a number of requestor devices in a digital requestor queue for the location; and
in response to receiving a transportation request from a requestor device, provide, for display via a requestor user interface, a queue request notification based on the current requestor queue status and the queue threshold.

16. The system of claim 15, further comprising instructions that, when executed by the at least one processor, cause the system to provide the queue request notification by:
determining a provider-based queue modifier based on a current number of provider devices;
determining a throughput-based queue modifier based on the throughput rate; and
providing the queue request notification based on the provider-based queue modifier and the throughput-based queue modifier.

17. The system of claim 16, further comprising instructions that,
when executed by the at least one processor, cause the system to:
determine a combined queue modifier by combining the provider-based queue modifier and the throughput-based queue modifier utilizing the current requestor queue status and the queue threshold; and
provide the queue request notification based on the combined queue modifier;
wherein the provider-based queue modifier comprises a first price modifier for adjusting a baseline transportation price based on the current number of provider devices; and
wherein the throughput-based queue modifier comprises a second price modifier for adjusting the baseline transportation price based on the throughput rate.

18. The system of claim 17, further comprising instructions that, when executed by the at least one processor, cause the system to:
select a final queue modifier based on the combined queue modifier and the provider-based queue; and
provide the queue request notification based on the final queue modifier.

19. The system of claim 16, wherein the queue request notification comprises at least one of: a user interface element comprising a price; a user interface element comprising an alternate location; a user interface element comprising a request to join an alternate digital requestor queue; or a user interface element comprising a request to modify a pick-up time.

20. The system of claim 15, further comprising instructions that, when executed by the at least one processor, cause the system to determine the queue threshold by:
generating a congestion model based on historical throughput rates and historical requestor devices corresponding to the location; and
determining the queue threshold based on an inflection point of the congestion model.

* * * * *